United States Patent
Send et al.

(10) Patent No.: US 10,412,283 B2
(45) Date of Patent: Sep. 10, 2019

(54) DUAL APERTURE 3D CAMERA AND METHOD USING DIFFERING APERTURE AREAS

(71) Applicant: trinamiX GmbH, Ludwigshafen am Rhein (DE)

(72) Inventors: Robert Send, Karlsruhe (DE); Ingmar Bruder, Neuleiningen (DE); Stephan Irle, Siegen (DE); Erwin Thiel, Siegen (DE)

(73) Assignee: trinamiX GmbH, Ludwigshafen am Rhein (DE)

( * ) Notice: Subject to any disclaimer, the term of this patent is extended or adjusted under 35 U.S.C. 154(b) by 0 days.

(21) Appl. No.: 15/758,135

(22) PCT Filed: Sep. 14, 2016

(86) PCT No.: PCT/EP2016/071628
§ 371 (c)(1),
(2) Date: Mar. 7, 2018

(87) PCT Pub. No.: WO2017/046121
PCT Pub. Date: Mar. 23, 2017

(65) Prior Publication Data
US 2018/0249051 A1 Aug. 30, 2018

(30) Foreign Application Priority Data
Sep. 14, 2015 (EP) .................................... 15185005

(51) Int. Cl.
*G01C 3/02* (2006.01)
*H04N 5/225* (2006.01)
(Continued)

(52) U.S. Cl.
CPC ............. *H04N 5/2254* (2013.01); *G01C 3/02* (2013.01); *H04N 5/2251* (2013.01);
(Continued)

(58) Field of Classification Search
CPC .. H04N 5/2254; H04N 13/207; H04N 5/2251; G01C 3/02
See application file for complete search history.

(56) References Cited

U.S. PATENT DOCUMENTS

| | | |
|---|---|---|
| 3,035,176 A | 5/1962 | Kis et al. |
| 3,112,197 A | 11/1963 | Neugebauer et al. |

(Continued)

FOREIGN PATENT DOCUMENTS

| | | |
|---|---|---|
| CA | 1065054 | 10/1979 |
| CA | 2196563 | 12/1996 |

(Continued)

OTHER PUBLICATIONS

International Search Report dated Nov. 7, 2017, in corresponding PCT/EP2017/057867.

(Continued)

*Primary Examiner* — Jamie J Atala
*Assistant Examiner* — Michael Robert Cammarata
(74) *Attorney, Agent, or Firm* — Oblon, McClelland, Maier & Neustadt, L.L.P.

(57) ABSTRACT

A camera (110) for recording at least one image of at least one object (112) is proposed. The camera (110) comprises: —at least one converging element (128), wherein the converging element (128) is adapted to converge a light beam (132) passing through the converging element (128) to travel along a beam path to be received by at least one optical sensor (114); —at least one first aperture element (130) having a first adjustable area (136), wherein the first aperture element (130) is located in the beam path between the converging element (128) and the optical sensor (114); —at least one second aperture element (134) having a second adjustable area (138), wherein the second aperture element (134) is located in the beam path between the first aperture (Continued)

element (130) and the optical sensor (114); —the at least one optical sensor (114) being adapted for receiving the light beam (132), wherein the optical sensor (114) is further adapted to generate at least one first picture in a first setting comprising the first aperture area (136) exceeding the second aperture area (138) and to generate at least one second picture in a second setting comprising the second aperture area (138) exceeding the first aperture area (134); and —at least one evaluation device (142) designed to generate at least one three-dimensional image of the at least one object (112) by comparing the at least one first picture and the at least one second picture. Thereby, a simple and, still, efficient three-dimensional camera (110) for an accurate recording of an image of at least one object (112) in space is provided.

21 Claims, 2 Drawing Sheets

(51) Int. Cl.
   *H04N 13/207*     (2018.01)
   *H04N 5/232*      (2006.01)

(52) U.S. Cl.
   CPC .......... *H04N 5/2256* (2013.01); *H04N 5/2258* (2013.01); *H04N 5/23296* (2013.01); *H04N 13/207* (2018.05)

(56) References Cited

U.S. PATENT DOCUMENTS

| | | |
|---|---|---|
| 3,384,752 A | 5/1968 | Odone |
| 3,562,785 A | 2/1971 | Craig |
| 3,564,268 A | 2/1971 | Bayne et al. |
| 3,937,950 A | 2/1976 | Hosoe et al. |
| 3,954,340 A | 5/1976 | Blomqvist et al. |
| 4,023,033 A | 5/1977 | Bricot et al. |
| 4,053,240 A | 10/1977 | Aizawa et al. |
| 4,079,247 A | 3/1978 | Briscot et al. |
| 4,256,513 A | 3/1981 | Yoshida |
| 4,286,035 A | 8/1981 | Nishizima et al. |
| 4,346,293 A | 8/1982 | Fetzer |
| 4,469,945 A | 9/1984 | Hoeberechts et al. |
| 4,524,276 A | 6/1985 | Ohtombe |
| 4,565,761 A | 1/1986 | Katagiri et al. |
| 4,584,704 A | 4/1986 | Ferren |
| 4,593,187 A | 6/1986 | Grotts et al. |
| 4,603,258 A | 7/1986 | Sher et al. |
| 4,647,193 A | 3/1987 | Rosenfeld |
| 4,675,535 A | 6/1987 | Tsunekawa et al. |
| 4,694,172 A | 9/1987 | Powell et al. |
| 4,760,004 A | 7/1988 | Rochat et al. |
| 4,760,151 A | 7/1988 | Rochat et al. |
| 4,767,211 A | 8/1988 | Munakata et al. |
| 4,773,751 A | 9/1988 | Matsuda et al. |
| 4,927,721 A | 5/1990 | Gratzel et al. |
| 4,952,472 A | 8/1990 | Baranyi et al. |
| 5,082,363 A | 1/1992 | Nakanishi et al. |
| 5,216,476 A | 6/1993 | Lanckton |
| 5,227,985 A | 7/1993 | Dementhon et al. |
| 5,291,066 A | 3/1994 | Neugebauer et al. |
| 5,350,644 A | 9/1994 | Graetzel et al. |
| 5,355,241 A | 10/1994 | Kelley |
| 5,375,008 A | 12/1994 | Guerreri |
| 5,576,975 A | 11/1996 | Sasaki et al. |
| 5,581,094 A | 12/1996 | Hara et al. |
| 5,589,928 A | 12/1996 | Babbitt et al. |
| 5,856,844 A | 1/1999 | Batterman et al. |
| 6,061,122 A | 5/2000 | Hoshino et al. |
| 6,163,371 A | 12/2000 | Kato et al. |
| 6,191,881 B1 | 2/2001 | Tajima |
| 6,229,913 B1 | 5/2001 | Nayar et al. |
| 6,266,142 B1 | 7/2001 | Junkins et al. |
| 6,359,211 B1 | 3/2002 | Spitler et al. |
| 6,417,836 B1 | 7/2002 | Kumar et al. |
| 6,512,233 B1 | 1/2003 | Sato et al. |
| 6,930,297 B1 | 8/2005 | Nakamura |
| 6,995,445 B2 | 2/2006 | Forrest et al. |
| 7,022,966 B2 | 4/2006 | Gonzo et al. |
| 7,049,601 B2 | 5/2006 | Agano |
| 7,196,317 B1 | 3/2007 | Meissner et al. |
| 7,247,851 B2 | 7/2007 | Okada et al. |
| 7,301,608 B1 | 11/2007 | Mendenhall et al. |
| 7,417,716 B2 | 8/2008 | Nagasaka et al. |
| 7,626,569 B2 | 12/2009 | Lanier |
| 7,677,742 B2 | 3/2010 | Hillmer et al. |
| 7,768,498 B2 | 8/2010 | Wey |
| 7,773,070 B2 | 8/2010 | Trisnadi et al. |
| 7,939,932 B2 | 5/2011 | Martin |
| 8,013,901 B2 | 9/2011 | Fukuhara et al. |
| 8,019,166 B2 | 9/2011 | Cheng et al. |
| 8,107,056 B1 | 1/2012 | Riza |
| 8,144,173 B2 | 3/2012 | Baba |
| 8,228,299 B1 | 7/2012 | Maloney et al. |
| 8,231,809 B2 | 7/2012 | Pschirer et al. |
| 8,345,003 B1 | 1/2013 | Trisnadi et al. |
| 8,363,526 B2 | 1/2013 | Hotta et al. |
| 8,390,793 B2 | 3/2013 | Yamaguchi et al. |
| 8,411,289 B2 | 4/2013 | Takahashi |
| 8,477,580 B2 | 7/2013 | Yamamoto et al. |
| 8,563,855 B2 | 10/2013 | Pschirer et al. |
| 8,593,565 B2 | 11/2013 | Shuster |
| 8,902,354 B2 | 12/2014 | Shuster |
| 8,908,157 B2 | 12/2014 | Eisele et al. |
| 9,104,910 B2 | 8/2015 | Huang |
| 9,385,326 B2 | 7/2016 | Wonneberger et al. |
| 9,389,315 B2 | 7/2016 | Bruder et al. |
| 9,428,518 B2 | 8/2016 | Wonneberger et al. |
| 9,557,856 B2 | 1/2017 | Send et al. |
| 9,646,365 B1 * | 5/2017 | Hinkel .................. G06T 5/003 |
| 9,665,182 B2 | 5/2017 | Send et al. |
| 9,741,954 B2 | 8/2017 | Bruder et al. |
| 9,787,899 B1 * | 10/2017 | Hinkel ............... H04N 5/23254 |
| 9,829,564 B2 | 11/2017 | Bruder et al. |
| 9,919,999 B2 | 3/2018 | Koenemann et al. |
| 9,958,535 B2 | 5/2018 | Send et al. |
| 9,989,623 B2 | 6/2018 | Send et al. |
| 10,012,532 B2 | 7/2018 | Send et al. |
| 10,094,927 B2 | 10/2018 | Send et al. |
| 10,120,078 B2 | 11/2018 | Bruder et al. |
| 2001/0025938 A1 | 10/2001 | Imai |
| 2002/0011576 A1 | 1/2002 | Cho et al. |
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0190117 A1 | 9/2004 | Kubaink |
| 2004/0216625 A1 | 11/2004 | Birnstock et al. |
| 2005/0052120 A1 | 3/2005 | Gupta et al. |
| 2005/0061957 A1 | 3/2005 | Kase |
| 2005/0122308 A1 | 6/2005 | Bell et al. |
| 2005/0184301 A1 | 8/2005 | Nagasaka et al. |
| 2005/0217720 A1 | 10/2005 | Rey-Mermet et al. |
| 2005/0227390 A1 | 10/2005 | Shtein et al. |
| 2005/0227406 A1 | 10/2005 | Shtein et al. |
| 2005/0268957 A1 | 12/2005 | Enomoto et al. |
| 2005/0269616 A1 | 12/2005 | Andriessen |
| 2006/0049397 A1 | 3/2006 | Pfeiffer et al. |
| 2006/0075535 P1 | 4/2006 | Krieger et al. |
| 2006/0082546 A1 | 4/2006 | Wey |
| 2007/0008515 A1 | 1/2007 | Otani et al. |
| 2007/0010924 A1 | 1/2007 | Otani et al. |
| 2007/0046625 A1 | 3/2007 | Yee |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2007/0183047 A1 | 8/2007 | Phillips et al. |
| 2007/0206181 A1 | 9/2007 | Arenberg et al. |

(56) References Cited

U.S. PATENT DOCUMENTS

| | | |
|---|---|---|
| 2008/0080789 A1 | 4/2008 | Marks |
| 2008/0157965 A1 | 7/2008 | Shahar |
| 2008/0170750 A1 | 7/2008 | Gordon |
| 2008/0259310 A1 | 10/2008 | Wada |
| 2008/0269482 A1 | 10/2008 | Pschirer et al. |
| 2008/0284925 A1 | 11/2008 | Han |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0097010 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2009/0322677 A1 | 12/2009 | Lee et al. |
| 2010/0073462 A1 | 3/2010 | Lee et al. |
| 2010/0091263 A1 | 4/2010 | Kumagai et al. |
| 2010/0141927 A1 | 6/2010 | Hashimoto et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0032365 A1 | 2/2011 | Yett |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0122287 A1* | 5/2011 | Kunishige .......... H04N 1/00114 348/229.1 |
| 2011/0123188 A1 | 5/2011 | Cardwell et al. |
| 2011/0127788 A1 | 6/2011 | Nakanishi |
| 2011/0181553 A1 | 7/2011 | Brown et al. |
| 2011/0194097 A1 | 8/2011 | Yamaguchi et al. |
| 2011/0284756 A1 | 11/2011 | Miko et al. |
| 2011/0286661 A1 | 11/2011 | Lee et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0013885 A1 | 1/2012 | Yang et al. |
| 2012/0061587 A1 | 3/2012 | Wu |
| 2012/0062517 A1 | 3/2012 | Lai et al. |
| 2012/0063287 A1 | 3/2012 | Yamamoto et al. |
| 2012/0105690 A1* | 5/2012 | Waqas ................... G03B 9/02 348/252 |
| 2012/0160298 A1 | 6/2012 | Kanamoto et al. |
| 2012/0162410 A1* | 6/2012 | Vaillant ................. G01C 3/085 348/135 |
| 2012/0206336 A1 | 8/2012 | Bruder et al. |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0262696 A1 | 10/2012 | Eisele et al. |
| 2012/0289672 A1 | 11/2012 | Kastler et al. |
| 2012/0293651 A1 | 11/2012 | Kawamata et al. |
| 2013/0033579 A1 | 2/2013 | Wajs |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0242283 A1 | 9/2013 | Bailey et al. |
| 2013/0266210 A1* | 10/2013 | Morgan-Mar .......... G06T 7/571 382/154 |
| 2013/0271818 A1 | 10/2013 | Maxik et al. |
| 2014/0015242 A1 | 1/2014 | Forrest |
| 2014/0043610 A1 | 2/2014 | Engel et al. |
| 2014/0066656 A1 | 3/2014 | Bruder et al. |
| 2014/0078376 A1 | 3/2014 | Shuster |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0233028 A1 | 8/2014 | Englund |
| 2014/0291480 A1 | 10/2014 | Bruder et al. |
| 2014/0347442 A1 | 11/2014 | Wang et al. |
| 2014/0368726 A1 | 12/2014 | Gladnick |
| 2015/0029326 A1* | 1/2015 | Backman ............. G02B 21/365 348/80 |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0170400 A1* | 6/2015 | Seitz ....................... G06T 15/08 345/427 |
| 2015/0286340 A1 | 10/2015 | Send et al. |
| 2015/0346911 A1 | 12/2015 | Christiansson |
| 2015/0372046 A1 | 12/2015 | Kim et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0248021 A1 | 8/2016 | Sundarraj et al. |
| 2016/0255323 A1* | 9/2016 | Wajs ....................... G06T 7/60 348/49 |
| 2016/0266257 A1 | 9/2016 | Bruder et al. |
| 2016/0286199 A1* | 9/2016 | Wajs ................... H04N 13/254 |
| 2016/0320489 A1 | 11/2016 | Send et al. |
| 2016/0364015 A1 | 12/2016 | Send et al. |
| 2017/0039793 A1 | 2/2017 | Send et al. |
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0067213 A1 | 3/2018 | Send et al. |
| 2018/0136319 A1 | 5/2018 | Send et al. |
| 2018/0210064 A1 | 7/2018 | Send et al. |
| 2018/0231376 A1 | 8/2018 | Send et al. |
| 2018/0238993 A1 | 8/2018 | Send et al. |
| 2018/0243045 A1* | 8/2018 | Franjic ................... A61B 90/30 |
| 2018/0249051 A1 | 8/2018 | Send et al. |
| 2018/0276843 A1 | 9/2018 | Send et al. |
| 2018/0329024 A1 | 11/2018 | Send et al. |
| 2018/0356501 A1 | 12/2018 | Send et al. |

FOREIGN PATENT DOCUMENTS

| | | |
|---|---|---|
| CN | 1270706 | 10/2000 |
| CN | 1677053 A | 10/2005 |
| CN | 1723564 A | 1/2006 |
| CN | 1777859 | 5/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |

(56) References Cited

FOREIGN PATENT DOCUMENTS

| | | |
|---|---|---|
| CN | 201897828 | 7/2011 |
| CN | 102435136 | 5/2012 |
| CN | 102506754 A | 6/2012 |
| CN | 102549380 | 7/2012 |
| CN | 102549381 A | 7/2012 |
| CN | 102737435 | 10/2012 |
| CN | 103106411 A | 5/2013 |
| CN | 103322910 A | 9/2013 |
| CN | 103403494 | 11/2013 |
| CN | 103492835 | 1/2014 |
| CN | 103649677 | 3/2014 |
| CN | 103650478 | 3/2014 |
| DE | 2 417 854 | 10/1974 |
| DE | 25 01 124 A1 | 8/1975 |
| DE | 32 25 372 A1 | 2/1983 |
| DE | 196 04 856 | 8/1997 |
| DE | 10146752 | 4/2002 |
| DE | 10 2005 043 627 A1 | 3/2007 |
| DE | 10 2005 053 995 | 5/2007 |
| DE | 10 2007 037 875 A1 | 2/2009 |
| DE | 10 2010 042 278 | 4/2012 |
| DE | 20 2012 009 070 | 1/2013 |
| DE | 10 2014 108 353 A1 | 12/2014 |
| EP | 0 112 169 A2 | 6/1984 |
| EP | 0 185 450 A2 | 6/1986 |
| EP | 0 309 631 | 4/1989 |
| EP | 0 754 930 A2 | 1/1997 |
| EP | 1 176 646 A1 | 1/2002 |
| EP | 1 191 819 | 3/2002 |
| EP | 1 330 117 | 7/2003 |
| EP | 1 373 272 | 1/2004 |
| EP | 1 667 246 A1 | 6/2006 |
| EP | 1 832 910 | 9/2007 |
| EP | 1 947 477 | 7/2008 |
| EP | 2 205 657 A1 | 7/2010 |
| EP | 2 220 141 A1 | 8/2010 |
| EP | 2 507 286 A2 | 10/2012 |
| EP | 2 527 866 A1 | 11/2012 |
| EP | 2 725 617 A1 | 4/2014 |
| EP | 2 813 324 | 12/2014 |
| EP | 2 818 493 A1 | 12/2014 |
| EP | 15 153 215 | 1/2015 |
| EP | 2 831 180 | 2/2015 |
| EP | 15 157 363 | 3/2015 |
| EP | 15 164 653 | 4/2015 |
| EP | 2 884 303 A1 | 6/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 008 421 | 4/2016 |
| EP | 3 008 757 | 4/2016 |
| EP | 3 036 503 | 6/2016 |
| GB | 2 432 723 | 5/2007 |
| JP | S59-50579 | 3/1984 |
| JP | 59-79805 | 5/1984 |
| JP | 61-89501 | 5/1986 |
| JP | S61-135280 | 6/1986 |
| JP | 61-186804 | 8/1986 |
| JP | 64-17485 | 1/1989 |
| JP | H02-170004 | 6/1990 |
| JP | 04-240817 | 8/1992 |
| JP | 5-48833 A | 2/1993 |
| JP | 05-240640 | 9/1993 |
| JP | 6-133321 | 5/1994 |
| JP | 7-146113 | 6/1995 |
| JP | 7-318630 | 12/1995 |
| JP | 8-159714 | 6/1996 |
| JP | 8-292586 A | 11/1996 |
| JP | 10-26513 A | 1/1998 |
| JP | 10-221064 | 8/1998 |
| JP | H11-230860 | 8/1999 |
| JP | 11-257917 | 9/1999 |
| JP | 11-325825 | 11/1999 |
| JP | 3110095 | 11/2000 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-189087 | 7/2005 |
| JP | 2005-241340 A | 9/2005 |
| JP | 2005-296268 | 10/2005 |
| JP | 2006-514366 | 4/2006 |
| JP | 2007-521559 | 8/2007 |
| JP | 2007-530978 | 11/2007 |
| JP | 2008-522418 | 6/2008 |
| JP | 2008-164538 | 7/2008 |
| JP | 2009-257890 | 11/2009 |
| JP | 2010-081002 | 4/2010 |
| JP | 2010-218770 | 9/2010 |
| JP | 2010-531520 | 9/2010 |
| JP | 2011-503673 | 1/2011 |
| JP | 2011-027707 | 2/2011 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | 99-09603 | 2/1999 |
| WO | WO 01/29576 A1 | 4/2001 |
| WO | WO 02/076988 | 10/2002 |
| WO | WO 02/101838 A1 | 12/2002 |
| WO | 03/012371 A1 | 2/2003 |
| WO | WO 03/098617 | 11/2003 |
| WO | WO 2004/072909 | 8/2004 |
| WO | WO 2004/114112 A1 | 12/2004 |
| WO | WO 2005/106965 A1 | 11/2005 |
| WO | WO 2007/006717 | 1/2007 |
| WO | WO 2007/054470 A1 | 5/2007 |
| WO | WO 2008/122531 | 10/2008 |
| WO | WO 2008/145172 | 12/2008 |
| WO | WO 2009/013282 A1 | 1/2009 |
| WO | WO 2009/021859 | 2/2009 |
| WO | WO 2009/053291 A1 | 4/2009 |
| WO | WO 2009/058115 A1 | 5/2009 |
| WO | WO 2009/105801 | 9/2009 |
| WO | WO 2010/088032 A2 | 8/2010 |
| WO | WO 2010/094636 A1 | 8/2010 |
| WO | WO 2010/118409 | 10/2010 |
| WO | WO 2010/118450 | 10/2010 |
| WO | WO 2011/067192 A2 | 6/2011 |
| WO | WO 2011/083722 | 7/2011 |
| WO | WO 2011/091967 A2 | 8/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/085803 A1 | 6/2012 |
| WO | 2012/110924 A1 | 8/2012 |
| WO | WO 2012/115593 | 8/2012 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/090960 | 6/2013 |
| WO | WO 2013/091016 A1 | 6/2013 |
| WO | 2013/118037 A1 | 8/2013 |
| WO | WO 2013/116883 | 8/2013 |
| WO | WO 2013/144177 A1 | 10/2013 |
| WO | WO 2013/156101 A1 | 10/2013 |
| WO | 2013/170982 A1 | 11/2013 |
| WO | 2014/086722 A1 | 6/2014 |
| WO | 2014/097181 A1 | 6/2014 |
| WO | 2014/097489 A1 | 6/2014 |
| WO | 2014/178923 A2 | 11/2014 |
| WO | 2014/198623 A1 | 12/2014 |

(56) References Cited

FOREIGN PATENT DOCUMENTS

| WO | 2014/198625 A1 | 12/2014 |
|---|---|---|
| WO | 2014/198626 A1 | 12/2014 |
| WO | 2014/198629 A1 | 12/2014 |
| WO | 2015/024871 A1 | 2/2015 |
| WO | WO 2015/081362 | 6/2015 |
| WO | WO 2015/091607 | 6/2015 |
| WO | WO 2015/159192 | 10/2015 |
| WO | WO 2015/161989 | 10/2015 |
| WO | WO 2015/162528 | 10/2015 |
| WO | WO 2015/177784 A2 | 11/2015 |
| WO | 2015/193804 A2 | 12/2015 |
| WO | 2016/005893 A1 | 1/2016 |
| WO | 2016/051323 A1 | 4/2016 |
| WO | 2016/092449 A1 | 6/2016 |
| WO | 2016/092454 A1 | 6/2016 |
| WO | WO 2016/083914 | 6/2016 |
| WO | 2016/120392 A1 | 8/2016 |
| WO | WO 2016/146725 | 9/2016 |

OTHER PUBLICATIONS

International Search Report dated Jul. 7, 2017, in corresponding PCT/EP2017/057825.
*Wikipedia*, Article denoted, "Thermocouple", retrieved Jul. 20, 2016.
Chinese Office Action dated Jan. 29, 2019, in Chinese Patent Application No. 201580036919.9.
Extended Search Report dated Aug. 23, 2011 in Europe Application No. 11154531.5 (With English Translation of Category of Cited Documents).
Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.
Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.
Ping-Hsin Huang, et al., "Synthesis and Characterization of new fluorescent two-photon absorption chromophores", J. Mater. Chem., vol. 16, 2006, pp. 850-857.
Qinglan Huang, et al., "Molecularly 'Engineered' Anode Adsorbates for Probing OLED Interfacial Structure-Charge Injection/Luminance Relationships: Large, Structure-Dependent Effects", J. Am. Chem. Soc., vol. 125, 2003, pp. 14704-14705.
A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.
G. R. A. Kumara, et al., "Fabrication of Dye-Sensitized Solar Cells Using Triethylamine Hydrothiocyanate as a CuI Crystal Growth Inhibitor", Langmuir, vol. 18, 2002, pp. 10493-10495.
Lukas Schmidt-Mende, et al., "Organic Dye for Highly Efficient Solid-State Dye-Sensitized Solar Cells", Adv. Mater., vol. 17, No. 7, 2005, pp. 813-815.
James Lindley, "Copper Assisted Nucleophilic Substitution of Aryl Halogen", Tetrahedron, vol. 40, No. 9, 1984, pp. 1433-1456.
Yunqi Liu, et al., "Synthesis and characterization of a novel bipolar polymer for light-emitting diodes", Chem. Commun., vol. 24, 1998, pp. 2747-2748.
Narukuni Hirata, et al., "Interface engineering for solid-state dye-sensitised nanocrystalline solar cells: the use of an organic redox cascade", Chem. Commun., vol. 5, 2006, pp. 535-537.
Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.
Bin Peng, et al., "Systematic investigation of the role of compact $TiO_2$ solar cells", Coordination Chemistry Reviews, vol. 248, 2004, pp. 1479-1489.
Jiun Yi Shen, et al., "High $T_g$ blue emitting materials for electroluminescent devices", J. Mater. Chem., vol. 15, 2005, pp. 2455-2463.
Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.
V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.
U. Bach, et al., "Solid-state dye-sensitized mesoporous $TiO_2$ solar cells with high photon-to-electron conversion efficiencies", Nature, vol. 395, 1998, pp. 583-585.
John P. Wolfe, et al., "Rational Development of Practical Catalysts for Aromatic Carbon-Nitrogen Bond Formation", Acc. Chem. Res. vol. 31, 1998, pp. 805-818.
Bryant H. Yang, et al., "Palladium-Catalyzed amination of aryl halides and sulfonates", Journal of Organometallic Chemistry, vol. 576, 1999, pp. 125-146.
Zhong Hui Li, et al., "Synthesis and Functional Properties of Strongly Luminescent Diphenylamino End-Capped Oligophenylenes", J. Org. Chem., vol. 69, 2004, pp. 921-927.
Brian O'Regan, et al., "A low-cost, high-efficiency solar cell based on dye-sensitized colloidal $TiO_2$ films", Letters to Nature, vol. 353, 1991, pp. 737-740.
International Search Report dated Sep. 24, 2014 in PCT/EP2014/061682.
International Preliminary Report on Patentability and Written Opinion dated Dec. 15, 2015 in PCT/EP2014/061682.
International Preliminary Report on Patentability and Written Opinion dated Dec. 23, 2015 in PCT/EP2014/061695.
International Search Report and Written Opinion dated May 31, 2012 in PCT/IB2012/050592 filed on Feb. 9, 2012.
Supplementary European Search Report dated Nov. 19, 2014, issued in corresponding European Patent Application No. EP 12 74 6808.
Volker Viereck, et al., Large-area applications of optical MEMS: micromirror arrays guide daylight, optimize indoor illumination, Optical Components, Photonik International 2, 2009, pp. 48-49.
C.U. Murade, et al., "High speed adaptive liquid microlens array", Optics Express, vol. 20, No. 16, Jul. 30, 2012, pp. 18180-18187 . . .
Jason Heikenfeld, et al., "Recent Progress in Arrayed Electrowetting Optics", Optics & Photonics News, vol. 20, No. 1, Jan. 1, 2009, pp. 20-26.
Tao Peng, "Algorithms and models for 3-D shape measurement using digital fringe projections", Dissertation, University of Maryland (College Park, Md.), Jan. 16, 2007, 268 pages (http://drum.lib.umd.edu//handle/1903/6654;http://en.wikipedia.org/wiki/Gray_code; http://en.wikipedia.org/wiki/Structured-fight_3D_scanner).
Jie-Ci Yang et al., "An Intelligent Automated Door Control System Based on a Smart", Sensors, 2013, 13(5), pp. 5923-5936; doi: 10.3390/s130505923 www.mdpi.com/journal/sensors.
Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462 www.acsnano.org.
International Search Report and Written Opinion dated Oct. 31, 2014 in PCT/EP2014/067466 filed Aug. 15, 2014.
Paul Pargas, "Phenomena of Image Sharpness Recognition of CdS and CdSe Photoconductors" Journal of the Optical Society of America, vol. 54, No. 4, Apr. 1964, pp. 516-519.
Paul Pargas, "A Lens Measuring Method Using Photoconductive Cells" Journal of the SMPTE, vol. 74, Jun. 1965, pp. 501-504.

(56) References Cited

OTHER PUBLICATIONS

Jack T. Billings, "An Improved Method for Critical Focus of Motion-Picture Optical Printers" Journal of the SMPTE, vol. 80, Aug. 1971, pp. 624-628.

International Search Report dated Sep. 9, 2014 in PCT/EP2014/061688 filed Jun. 5, 2014.

Written Opinion of the International Searching Authority dated Sep. 9, 2014 in PCT/EP2014/061688 filed Jun. 5, 2014.

International Search Report and Written Opinion of the International Searching Authority dated Mar. 12, 2015 in PCT/EP2014/078155 Filed Dec. 17, 2014.

International Search Report and Written Opinion of the International Searching Authority dated May 16, 2014 in PCT/IB2013/061095.

Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.

Atte Haapalinna, et al., "Measurement of the Absolute Linearity of Photodetectors with a Diode Laser," Meas. Sci. Technol., 10, (1999) 1075-1078.

M. R. Andersen, et al., "Kinect Depth Sensor Evaluation for Computer Vision Applications",Electrical and Computer Engineering, Technical Report ECE-TR-6, Aarhus University, 2012, 39 pages.

Takumi Kinoshita, et al., "Wideband dye-sensitized solar cells employing a phosphine-coordinated ruthenium sensitizer", Nature Photonics, vol. 7, 2013, pp. 535-239.

Office Action dated Apr. 22, 2015 in Chinese Patent Application No. 201280018328.5 (submitting English translation only).

International Search Report and Written Opinion dated Sep. 3, 2014 in PCT/EP2014/061691.

International Preliminary Report on Patentability dated Sep. 25, 2015 in PCT/EP2014/061691.

Kuthirumal, S., et al., "Flexible Depth of Field Photography," IEEE Transactions on Pattern Analysis and Machine Intelligence, vol. 33, No. 1 (2011), pp. 58-71.

Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25, 1998, pp. 953-959.

International Preliminary Report on Patentability and Written Opinion dated Dec. 23, 2015 in PCT/EP2014/061688.

International Search Report and Written Opinion dated Nov. 21, 2014 in PCT/EP2014/067465.

"So funktioniert die DLP-Technologie" DLP-Technologie—www.dlp.com/de/technology/how-dlp-works, 2014, 2 Pages.

"New—Ultra-Compact Pockels Cells with Brewster Polarizer and Waveplate for Laser Q-Switching" Leysop Ltd, Manfacturers and Suppliers of Electro-Optic Components—http://www.leysop.com/integrated_pockels_cell.htm, Aug. 4, 2013, 2 Pages.

International Search Report dated Aug. 28, 2015, in PCT/IB2015/052769, filed Apr. 16, 2015.

International Search Report and Written Opinion dated Jun. 30, 2015 in PCT/IB15/052233 Filed Mar. 26, 2015.

International Search Report dated Sep. 22, 2015, in Application No. PCT/IB2015/052785, filed on Apr. 16, 2015.

International Search Report dated Nov. 27, 2015, in PCT/IB2015/055121, filed Jul. 7, 2015.

International Search Report and Written Opinion dated Mar. 29, 2016, in PCT/IB2015/054536, filed Jun. 16, 2015.

International Search Report and Written Opinion dated Jan. 18, 2016 in PCT/IB2015/057412 filed Sep. 28, 2015.

Wang, Feng-Peng et al., "Distance Measurement using Digital Cameras Based on Laser Spot Detection", published on Jun. 30, 2011, School of Physics and Electronic Information, Gannan Normal University, Ganzhou 341000, China (with English Abstract).

Bahaa E. A. Saleh, et al., "Fundamentals of Photonics" John Wiley & Sons, Inc., Chapter 3, 1991, pp. 80-107 (with Cover Page).

International Search Report dated Mar. 21, 2016 in PCT/IB2015/059406.

International Search Report and Written Opinion in PCT/IB2015/059411 dated Mar. 16, 2016 filed Dec. 7, 2015.

Nam-Trung Nguyen, "Micro-optofluidic Lenses: A review", Biomicrofluidics, 2010, vol. 4, 031501-15.

Uriel Levy et al., "Tunable optofluidic devices", Microfluid Nanofluid, 2008, vol. 4, pp. 97-105.

International Search Report dated Mar. 22, 2016 in PCT/IB2015/059408 filed Dec. 7, 2015.

International Search Report dated Mar. 15, 2016 in PCT/IB2015/059404 filed Dec. 7, 2015.

International Search Report and Written Opinion dated Mar. 21, 2016, in PCT/IB2015/059403, filed Dec. 7, 2015.

International Preliminary Report and Written Opinion dated Mar. 10, 2016, in PCT/IB2015/059404.

International Search Report and Written Opinion dated May 27, 2016, in PCT/EP2016/051817, filed Jan. 28, 2016.

International Search Report dated May 20, 2016, in PCT/EP2016/054532.

International Preliminary Report on Patentability dated Aug. 1, 2017, in PCT/EP2016/051817.

Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.

Antonio Facchetti, "Polymer donor-polymer acceptor (all-polymer) solar Cells", Materials Today, vol. 16 No. 4, Apr. 2013, pp. 123-132.

Graham H. Carey, et al., "Colloidal Quantum Dot Solar Cells", Chemical Reviews, vol. 115 No. 23, 2015, pp. 12732-12763.

Jason P. Clifford, et al., "Fast, Sensitive and Spectrally Tunable Colloidal Quantum-Dot Photodetectors", Nature Nanotechnology, Jan. 2009, pp. 1-5.

Kotaro Fukushima, et al., "Crystal Structures and Photocarrier Generation of Thioindigo Derivatives", Journal of Physical Chemistry B, vol. 102 No. 31, 1998, pp. 5985-5990.

Serap Günes, et al., "Hybrid Solar Cells", Inorganica Chimica Acta, vol. 361, 2008, pp. 581-588.

R. S. Mane, et al., "Chemical Deposition Method for Metal Chalcogenide Thin Films", Materials Chemistry and Physics, vol. 65, 2000, pp. 1-31.

Wilfried Hermes, "Emerging Thin-Film Photovoltaic Technologies", Chemie Ingenieur Technik, 2015, vol. 87 No. 4, pp. 376-389.

Paul H. Keck, "Photoconductivity in Vacuum Coated Selenium Films", Journal Optical Society of America, vol. 42 No. 4, Apr. 1952, pp. 221-225, with cover page.

Frank H. Moser, et al., "Phthalocyanine Compounds", Reinhold Publishing Corporation, 1963, p. 69-76 with cover pages.

M. Popescu, "Disordered Chalcogenide Optoelectronic Materials: Phenomena and Applications", Journal of Optoelectronics and Advanced Materials, vol. 7 No. 4, Aug. 2005, pp. 2189-2210.

Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1- 127.

F. Stöckmann, "Superlinear Photoconductivity", Physica Status Solidi, vol. 34, 1969, pp. 751-757.

Evangelos Theocharous, "Absolute Linearity Measurements on a PbS Detector in the Infrared", Applied Optics, vol. 45 No. 11, Apr. 10, 2006, pp. 2381-2386.

Evangelos Theocharous, et al., "Absolute Linearity Measurements on HgCdTe Detectors in the Infrared Region", Applied Optics, vol. 43 No. 21, Jul. 20, 2004, pp. 4182-4188.

Arthur L.Thomas, "Phthalocyanine Research and Applications", CRC Press, 1990, pp. 253-271 with cover pages.

International Search Report and Written Opinion dated Jul. 19, 2016 in PCT/EP2016/058487 filed Apr. 18, 2016.

International Preliminary Report on Patentability and Written Opinion dated Feb. 1, 2018, in PCT/EP2016/066783.

http://www.plenoptic.info/pages/refocusing.html.

C. Hahne, A. Aggoun, S. Haxha, V. Velisavljevic, and J. Fernández, "Light field geometry of a standard plenoptic camera," Opt. Express 22, 26659-26673 (2014).

C. Hahne, A. Aggoun, S. Haxha, V. Velisavljevic, and J. Fernández, "Baseline of virtual cameras acquired by a standard plenoptic

(56) References Cited

OTHER PUBLICATIONS camera setup," in 3D-TV-Conference: The True Vision—Capture, Transmission and Display of 3D Video (3DTV-CON), Jul. 2-4, 2014.
C. Hahne, A. Aggoun, and V. Velisavljevic, "The refocusing distance of a standard plenoptic photograph," in 3D-TV-Conference: Tthe True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photography X, 902305 (Mar. 7, 2014).
Baeg et al., "Organic Light Detectors: Photodiodes and Phototransistors", *Advanced Materials*, vol. 25, No. 31, Mar. 11, 2013, pp. 4267-4295.
Office Action dated Jan. 3, 2018, in Chinese Patent Application No. 201610552144.7 parallel to U.S. Appl. No. 15/364,680.
International Preliminary Report on Patentability and Written Opinion dated Feb. 22, 2018 in PCT/EP2016/069049).
Office Action dated Mar. 5, 2018, in corresponding Chinese Patent Application No. 201480056299.0.
R. M. Schaffert, "A New High-Sensitivity Organic Photoconductor for Electrophotography", *IBM J. Res. Develop.*, 1971, p. 75-89.
P. Gregory, Ed., *Chemistry and Technology of printing and imaging systems*, Chapman & Hall, 1996, Chap. 4, R.S. Gairns, *Electrophotography*, p. 76-112.
International Search Report and Written Opinion dated Nov. 17, 2016, in PCT/EP2016/071628, filed Sep. 14, 2016.
"Telezentrisches Objektiv" Retrieved from the Internet: https://de.wikipedia.org/wiki/Telezentrisches_Objektiv. Date of retrieval: Sep. 11, 2015, 3 Pages.
Office Action dated Dec. 18, 2018, in Japanese Patent Application No. 2016-518930.
Petr Bartu et al, "Conformable Large-AreaPposition-Sensitive Photodetectors Based on Luminescence-Collecting Silicone Waveguides," *Journal of Applied Physics*, 107, 123101 (2010).
Roland Stolarski, "Fluorescent Naphthalimide Dyes for Polyester Fibres," *Fibres & Textiles* in Eastern Europe, vol. 17, No. 2 (73) pp. 91-95 (2009).
Ayse Aktas et al., "Synthesis, Characterization, Electrochemical and Spectroelectrochemical Properties of Peripherally Tetra-Substituted Metal-Free and Metallophthalocyanines," *Dyes and Pigments*, 99, (2013) 613-619.
Hairong Li, et al., "Synthesis and Properties of Octa-, Tetra, and Di-Hydroxy-Substituted Phthalocyanines," *Tetrahedron*, 65 (2009) 3357-3363.
"Methine Dyes and Pigments," *Ullmann's Encyclopedia of Industrial Chemistry*, vol. 23 (2012).
Jing Liu, et al., "Sulfone-Rhodamines: A New Class of Near-Infrared Fluorescent Dyes for Bioimagin," *ACS Applied Materials & Interfaces*, 8, 22953-22962 (2016).
E. Noelting et al., "Berichte der deutschen chemischen Gesellschaft", *Band*, 38, S. 3516-3527 (1905) . . . .
T. Nedelcev et al., "Preparation and Characterization of a New Derivative of Rhodamine B with an Alkoxysilane Moiety," *Dyes and Pigments*, 76 (2008), 550-556.
Aurora Loudet et al., "BODIPY Dyes and Their Derivatives: Syntheses and Spectroscopic Properties," *Chem.Rev.*, 107 (2007) 4981-4932.
Weili Zhao, et al., "Conformationaily Restricted Aza-Bothpy: A Highly fluorescent, Stable, Near-Infrared-Absorbing Dye", *Angew. Chem. Int. Ed.*, 44 (2005) 1677-1679.
Georg M. Fischer, et al., "Near-Infrared Dyes and Fluorophores Based on Diketopyrrolopyrroles," *Angew. Chem. Int. Ed.* 46 (2007) 3750-3753.
Amaresh Mishra et al., "Small Molecule Organic Semiconductors on the Move: Promises for Future Solar Energy Technology," *Angew. Chem. Int. Ed.*, 51, (2012), 2020-2067.
G. Seybold et al., "New Perylene and Violanthrone Dyestuffs for Fluorescent Collectors," *Dyes and Pigments*, 11 (1989) 303-317.

Nam-Trung Nguyen, "Micro-Optofluidic Lenses: A Review", *Biomicrofluidics*, 4, (2010) 031501.
Uriel Levy et al., "Tunable Optofluidic Devices," *Microfluid Nanofluid* (2008) 4: 97-105.
Robert Koeppe et al., "Video-Speed Detection of the Absolute Position of a Light Point on a Large-Area Photodetector Based on Luminescent Waveguides," *Optics Express*, vol. 18, No. 3, (Feb. 1, 2010), 2209.
Benjamin F. Grewe, et al., "Fast Two-Layer Two-Photon Imaging of Neuronal Cell Populations Using an Electrically Tunable Lens," *Biomedical Optics Express*, vol. 2, No. 7, Jul. 1, 2011 (pp. 2035-2046).
Office Action dated Jul. 9, 2018, in Japanese Patent Application No. 2017-007544.
Xing Lin, et al., "Coded focal stack photography", Computational Photography (ICCP), 2013 IEEE International Conference on, Apr. 19, 2013, XP032424246, pp. 1-9.
Nabeel A. Riza, et al., "Noncontact distance sensor using spatial signal processing", Optics Letters, Optical Society of America, vol. 34, No. 4, Feb. 15, 2009, XP001522006, pp. 434-436.
Nabeel A. Riza, et al., "Smart agile lens remote optical sensor for three-dimensional object shape measurements", Applied Optics, Optical Society of America, vol. 49, No. 7, Mar. 1. 2010, XP001552714, pp. 1139-1150.
Street (Ed.): Technology and Applications of Amorphous Silicon, Springer-Verlag Heidelberg, 2010, pp. 346-349.
International Search Report dated Aug. 17, 2017, in corresponding PCT/EP2017/060057.
International Search Report dated Aug. 1, 2017, in corresponding PCT/EP2017/060058.
Walter Fuhs, "Hydrogenated Amorphous Silicon—Material Properties and Device Applications", in S. Baranovski, Charge Transport in Disordered Solids, Wiley, p. 97-147, 2006.
A.G. Pattantyus-Abraham, I.J. Kramer, A.R. Barkhouse, X. Wang, G. Konstantatos, R. Debnath, L. Levina, I. Raabe, M.K. Nazeeruddin, M. Grätzel, and E.H. Sargent, *Depleted-Heterojunction Colloidal Quantum Dot Solar Cells*, ACS NANO 4 (6), May 24, 2010.
R. Martins and E. Fortunato, *Thin Film Position Sensitive Detectors: from 1D to 3D Applications*, Chap. 8 in R. A. Street (Ed.), *Technology and Applications of Amorphous Silicon*, Springer, 2010.
International Search Report dated Oct. 20, 2017 in PCT/EP2017/068956 filed on Jul. 27, 2017.
Leskela, M. et al., "Preparation of lead sulfide thin films by the atomic layer epitaxy process," Pergamon Press plc, Vacuum/vol. 41/Nos. 4-6, pp. 1457-1459 (1990).
Dasgupta, N. et al., "Fabrication and Characterization of Lead Sulfide Thin Films by Atomic Layer Deposition," The Electrochemical Society, ECS Transactions, 16 (4) 29-36 (2008), Total 8 pages.
Dasgupta, N. et al., "Design of an atomic layer deposition reactor for hydrogen sulfide compatibility," Review of Scientific Instruments 81, 044102 (2010). Total 6 pages.
Xu, J. et al., "Atomic layer deposition of absorbing thin films on nanostructured electrodes for short-wavelength infrared photosensing," AIP Publishing, Applied Physics Letters 107, 153105 (2015), Total 5 pages.
Blount, G., et al., "Photoconductive properties of chemically deposited PbS with dielectric overcoatings," AIP Publishing, Journal of Applied Physics 46, 3489 (1975), Total 12 pages.
Groner, M. et al., "Low-Temperature Al2O3 Atomic Layer Deposition," American Chemical Society, Chem. Mater., vol. 16. No. 4, 2004, pp. 639-645.
Yoon, W. et al., "Electrical Measurement Under Atmospheric Conditions of PbSe Nanocrystal Thin Films Passivated by Remote Plasma Atomic Layer Deposition of Al2O3," IEEE Transactions on Nanotechnology. vol. 12, No. 2. Mar. 2013, pp. 146-151.
Hu, C., et al., "Air-stable short-wave infrared PbS colloidal quantum dot photoconductors passivated with Al2O3 atomic layer deposition," AIP Publishing, Applied Physics Letters 105, 171110 (2014), Total 5 pages.
Liu, Y., et al., "Robust, Functional Nanocrystal Solids by Infilling with Atomic Layer Deposition," ACS Publications, American Chemical Society, Nano Letters 2011, 11, pp. 5349-5355.

(56) References Cited

OTHER PUBLICATIONS

Liu, Y., et al., "PbSe Quantum Dot Field-Effect Transistors with Air-Stable Electron Mobilities above 7 $cm^2$ $V^{-1}$ $s^{-1}$," ACS Publications, American Chemical Society, Nano Letters 2013, 13, pp. 1578-1587.
George, S., "Atomic Layer Deposition: An Overview," American Chemical Society, Chem. Rev. 2010, 110, pp. 111-131.
Konstantatos, G., et al., "Engineering the Temporal Response of Photoconductive Photodetectors via Selective Introduction of Surface Trap States," American Chemical Society, Nano Letters 2008, vol. 8, No. 5, pp. 1446-1450.
Soci, C., et al., "ZnO Nanowire UV Photodetectors with High Internal Gain," American Chemical Society, Nano Letters 2007, vol. 7, No. 4, pp. 1003-1009.
List of integrated circuit packaging types (Wikipedia article, downloaded Jan. 15, 2019 from https://en.wikipedia.org/wiki/List_of_integrated_circuit_packaging_types).
List of integrated circuit packaging types, Dimension Reference (Wikipedia article, downloaded Jan. 15, 2019 from https://en.wikipedia.org/wiki/List_of_integrated_circuit_packaging_types#PIN-PITCH).
Davide Scaramuzza, et al., "Extrinsic Self Calibration of a Camera and a 3D Laser Range Finder from Natural Scenes" IEEE/RSJ International Conference on Intelligent Robots and Systems, IROS 2007, 2007, pp. 4164-4169.
Denis Klimentjew, et al., "Multi Sensor Fusion of Camera and 3D Laser Range Finder for Object Recognition" IEEE International Conference on Multisensor Fusion and Integration for Intelligent Systems (MFI), 2010, pp. 236-241.
U.S. Appl. No. 14/897,981, filed May 2016, US 2016-0124074 A1, Henrike Wonneberger, et al.
U.S. Appl. No. 15/727,733, filed Feb. 2018, US 2018-0031672 A1, Ingmar Bruder, et al.
U.S. Appl. No. 15/587,420, filed Aug. 2017, US 2017-0237926 A1, Ingmar Bruder, et al.
U.S. Appl. No. 15/367,213, filed Mar. 2017, US 2017-0082486 A1, Robert Send, et al.
U.S. Appl. No. 15/105,489, filed Nov. 2016, US 2016-0320489 A1, Robert Send, et al.
U.S. Appl. No. 15/305,379, filed Mar. 2017, US 2017-0074652, Robert Send, et al.
U.S. Appl. No. 15/492,007, filed Aug. 2017, US 2017-0219694 A1, Robert Send, et al.
U.S. Appl. No. 15/304,328, filed Feb. 2017, US 2017-0039793 A1, Robert Send, et al.
U.S. Appl. No. 15/301,112, filed May 2017, US 2017-0140786 A1, Robert Send, et al.
U.S. Appl. No. 15/234,223, filed Jul. 2017, US 2017-0205230 A1, Robert Send, et al.
U.S. Appl. No. 15/319,156, filed May 2017, US 2017-0123593 A1, Robert Send, et al.
U.S. Appl. No. 15/534,335, filed Dec. 2017, US 2017-0363465 A1, Robert Send, et al.
U.S. Appl. No. 15/534,294, filed Jun. 8, 2017, Robert Send.
U.S. Appl. No. 15/514,830, filed Aug. 2017, US 2017-0219709 A1, Robert Send, et al.
U.S. Appl. No. 15/534,041, filed Dec. 2017, US 2017-0363741 A1, Robert Send, et al.
U.S. Appl. No. 15/533,572, filed Jan. 2018, US 2018-0003993 A1, Robert Send, et al.
U.S. Appl. No. 15/534,343, filed Jan. 2018, US 2018-0007343 A1, Robert Send, et al.
U.S. Appl. No. 15/547,664, filed Jan. 2018, US 2018-0017679 A1, Valouch, et al.
U.S. Appl. No. 15/554,496, filed Mar. 2018, US 2018-0067213 A1, Robert Send, et al.
U.S. Appl. No. 15/567,885, filed Oct. 19, 2017, Robert Send, et al.
U.S. Appl. No. 15/751,283, filed Feb. 8, 2018, Robert Send, et al.
U.S. Appl. No. 15/744,334, filed Jan. 12, 2018, Robert Send, et al.

* cited by examiner

DUAL APERTURE 3D CAMERA AND METHOD USING DIFFERING APERTURE AREAS

FIELD OF THE INVENTION

The invention relates to a camera for an optical recording of at least one image of at least one object, in particular, for recording a three-dimensional image, thereby determining a position of the object with regard to a depth of the object. Further, the invention relates to a tracking system, to a method for optically recording at least one image of at least one object and to specific uses of the camera.

PRIOR ART

Various cameras for optically recording at least one image of at least one object are known, wherein the camera, generally, comprises a housing having at least one opening, wherein a converging element, such as a converging lens, being located at the opening is adapted to converge a light beam passing through the converging element to travel on a beam path along an optical axis to be received by at least one optical sensor located within the housing. Generally, the optical sensor comprises an inorganic imaging sensor, such as a pixelated inorganic chip, a pixelated organic detector; a CCD chip, preferably a multi-color CCD chip or a full-color CCD chip; a CMOS chip; an IR chip; an RGB chip.

Further, optical sensors which employ the focus induced photoresponse (FiP) effect are known. WO 2012/110924 A1 and WO 2014/097181 A1 each disclose a camera comprising at least one optical sensor, wherein the optical sensor exhibits at least one sensor region. Herein, the optical sensor is designed to generate at least one sensor signal in a manner dependent on an illumination of the sensor region. According to the so-called "FiP effect", the sensor signal, given the same total power of the illumination, is hereby dependent on a geometry of the illumination, in particular on a beam cross-section of the illumination on the sensor area. The detector furthermore has at least one evaluation device designated to generate at least one item of geometrical information from the sensor signal. In order to provide 3D images of the object, a combination which comprises at least one longitudinal optical sensor and at least one transversal optical sensor is proposed.

Despite the advantages implied by the above-mentioned devices and detectors, specifically by the detectors as disclosed in WO 2012/110924 A1 and in WO 2014/097181 A1, there still is a need for improvements with respect to a simple, cost-efficient and, still, reliable spatial camera, in particular, for recording 3D images.

Problem Addressed by the Invention

Therefore, a problem addressed by the present invention is that of specifying a device and a method for optically recording at least one image of at least one object which at least substantially avoids the disadvantages of known devices and methods of this type. In particular, an improved simple, cost-efficient and, still, reliable spatial camera for recording 3D-images would be desirable.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a camera for optically recording at least one image of the at least one object, in particular, for recording a 3D image of the object, thereby determining a position of the object with regard to a depth of the object, is disclosed.

The "object" generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

As used herein, a "position" generally refers to an arbitrary item of information on a location and/or orientation of the object in space. For this purpose, as an example, one or more coordinate systems may be used, and the position of the object may be determined by using one, two, three or more coordinates. As an example, one or more Cartesian coordinate systems and/or other types of coordinate systems may be used. In one example, the coordinate system may be a coordinate system of the camera in which the camera has a predetermined position and/or orientation. As will be outlined in further detail below, the camera may have an optical axis, which may constitute a main direction of view of the camera. The optical axis may form an axis of the coordinate system, such as a z-axis. Further, one or more additional axes may be provided, preferably perpendicular to the z-axis.

Thus, as an example, a coordinate system may be employed for the camera in which the optical axis forms the z-axis and in which, additionally, an x-axis and a y-axis may be provided which are perpendicular to the z-axis and which are perpendicular to each other. As an example, the optical sensor may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

As used herein, the camera is a device which is adapted for providing at least one image of the at least one object. Thus, the camera is generally a device which is adapted for performing photography. Specifically, the camera may be used for 3D photography, specifically for digital 3D photography. Thus, the camera may form a digital 3D camera or may be part of a digital 3D camera. The camera may be a stationary device or a mobile device. Further, the camera may be a stand-alone device or may form part of another device, such as a computer, a vehicle or any other device. Further, the camera may be a hand-held device. Other embodiments of the camera are feasible.

As used herein, the term "photography" generally refers to the technology of acquiring image information of at least one object. As further used herein, the term "digital photography" generally refers to the technology of acquiring image information of at least one object by using a plurality of light-sensitive elements adapted to generate electrical signals indicating an intensity of illumination, preferably digital electrical signals. As further used herein, the term "3D photography" generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences. In the latter case, the camera preferably comprises a data memory for storing the image sequence. Thus, generally, the present invention refers to a camera, specifically a digital camera, more specifically a 3D camera or digital 3D camera, for imaging at least one object. As outlined above, the term "imaging", as used herein, generally refers to acquiring image information of at least one object.

The camera may be adapted to provide the at least one image of the at least one object in any feasible way. Thus, the information may e.g. be provided electronically, visually, acoustically or in any arbitrary combination thereof. The image may further be stored in a data storage of the camera or a separate device and/or may be provided via at least one interface, such as a wireless interface and/or a wire-bound interface.

The camera for recording an optical image of at least one object according to the present invention comprises:
  at least one converging element, wherein the converging element is adapted to converge a light beam passing through the converging element to travel along a beam path to be received by at least one optical sensor;
  at least one first aperture element having a first adjustable area, wherein the first aperture element is located in the beam path between the converging element and the optical sensor;
  at least one second aperture element having a second adjustable area, wherein the second aperture element is located in the beam path between the first aperture element and the optical sensor;
  the at least one optical sensor being adapted for receiving the light beam, wherein the optical sensor is further adapted to generate at least one first picture in a first setting comprising the first aperture area exceeding the second aperture area and to generate at least one second picture in a second setting comprising the second aperture area exceeding the first aperture area; and
  at least one evaluation device designed to generate at least one image of the at least one object by comparing the at least one first picture and the at least one second picture.

Herein, the components listed above may be separate components. Alternatively, two or more of the components as listed above may be integrated into one component. Further, the at least one evaluation device may be formed as a separate evaluation device independent from the transfer device and the optical sensors, but may preferably be connected to the optical sensors in order to receive the sensor signal. Alternatively, the at least one evaluation device may fully or partially be integrated into the optical sensors.

Preferably, the camera adapted for recording an optical image of at least one object comprises at least one housing, especially a single housing, in particular, in order to allow recording the optical image of the at least one object with as little interference as possible by other objects and/or illumination sources. Thus, preferably, the housing comprises a solid case having at least one opening, wherein at least one converging element is located at the opening of the housing, while at least one optical sensor is placed inside the housing mainly due to the above-mentioned reasons. Moreover, further elements of the camera may be located inside or outside the housing. Preferably, while at least one first aperture element as well as at least one second aperture element may be placed inside the housing while at least one evaluation device designed to generate at least one image of at least one object may be located inside or outside the housing, depending on purpose and/or design of the camera. Furthermore, additional elements of the camera, in particular, at least one illumination source, at least one modulation device and/or at least one imaging device may also be placed inside or outside the housing in accordance with technical and/or design-related considerations.

In accordance with the present invention, the camera comprises at least one transfer device, wherein the transfer device comprises at least one converging element and at least one first aperture element. Herein, the converging element which is adapted to converge a light beam passing through the converging element to travel along a beam path, preferably along the optical axis of the camera, to be received by the at least one optical sensor may comprise an optical element which exhibits converging properties to the incident light beam. Preferably, an optical lens, in particular one or more refractive lenses, particularly converging thin refractive lenses, such as convex or biconvex thin lenses, and/or one or more convex mirrors, and/or a compound lens, wherein the compound lens may be adapted to function as a telecentric lens or a hypercentric lens, which will be explained later in more detail, may be arranged along the common optical axis for this purpose.

Most preferably, the light beam which emerges from the object travels first through the at least one transfer device which comprises the converging element and the first aperture element and thereafter through the second aperture element being located in the beam path between the first aperture element and the optical sensor until it may finally impinge on the one or more optical sensors. As used herein, the term "transfer device" refers to an optical element which may be configured to transfer the at least one light beam emerging from the object to the optical sensor within the camera. Thus, the transfer device can be designed to feed light propagating from the object to the optical sensor, wherein this feeding can optionally be affected by means of imaging or else by means of non-imaging properties of the transfer device. In particular the transfer device can be designed to collect the electromagnetic radiation before the latter is fed to the optical sensor.

In addition, the at least one transfer device may have imaging properties. Consequently, the transfer device comprises at least one imaging element, for example at least one lens and/or at least one curved mirror, since, in the case of such imaging elements, for example, a geometry of the illumination on the sensor region can be dependent on a relative positioning, for example a distance, between the transfer device and the object. As used herein, the transfer device may be designed in such a way that the electromagnetic radiation which emerges from the object is transferred completely to the optical sensor, in particular if the object is arranged in a visual range of the optical sensor.

In addition, the transfer device may also be employed for modulating light beams, such as by using a modulating transfer device. Herein, the modulating transfer device may be adapted to modulate the frequency and/or the intensity of an incident light beam before the light beam might impinge on the optical sensor. Herein, the modulating transfer device may comprise means for modulating light beams and/or may be controlled by the modulation device, which may be part of the evaluation device and/or may be at least partially implemented as a separate unit.

In addition to the converging element, the transfer device, as already mentioned above, further comprises at least one first aperture element, which may also be denoted as "field aperture". In addition, the camera furthermore comprises at least one second aperture element being placed in the beam path between the first aperture element and the optical sensor, which may also be denominated as "exit aperture". As generally used, the term "aperture element" refers to an optical element which is placed on a beam path of an incident light beam which, subsequently, impinges on the optical sensor, wherein the aperture element may only allow a portion of the incident light beam to pass through while the other portions of the incident light beam are stopped and/or reflected, such as to one or more targets outside the optical sensor. As a result, the term "aperture element" may, thus, refer to an optical element having an opaque body and an opening inserted into the opaque body, wherein the opaque body may be adapted to stop a further passage of the incident light beam and/or to reflect the light beam while that portion of the incident light which may impinge on the opening, usually denoted as the "aperture", can pass through the aperture element. Thus, the aperture element may also be denominated as a "diaphragm" or a "stop", wherein the term "aperture stop" may be used in a case in which the stop is adapted to limit a brightness of the incident light beam reaching a focal plane while the terms "field stop" or "flare stop" may by used for stops adapted for other purposes.

Preferably, the opening of the aperture element may be adjustable. Accordingly, the aperture element may have an adjustable area which corresponds to the respective adjustable degree of opening of the aperture. As a result, the adjustable area may indicate a degree of opening of the aperture element. For this purpose, the opening of the aperture may be switchable between at least two individual states with a different degree of opening. By way of example, the opening of the aperture may, thus, be switchable between two individual states which exhibit a different degree of opening. As a further example, the opening of the aperture may be switchable between three, four, five, six or more of individual states which may exhibit an increasing or decreasing degree of opening, such as in a step-wise manner. However, further examples are possible. Alternatively, the opening of the aperture element may be switchable in a continuous manner within a given range, such as by using an adjustable diaphragm, also denominated as an "iris diaphragm" or, simply, "iris".

Preferably, the opening of the aperture element may be located at a center of the aperture element, particularly in a manner that the center of the aperture element may be retained between the different individual states. Herein, the aperture element may, in particular, be placed inside the housing of the camera in a manner that the center of the aperture element coincides with the optical axis of the camera. Alternatively, in addition to switching the opening of the aperture between the different individual states the location of the aperture element, in particular the center of the aperture element, may further be adjustable in a manner which may be perpendicular to the optical axis of the camera between at least two of the different individual states. However, other arrangements may be possible, such as where the center of the aperture element may be located in a position off the common optical axis of the camera.

Alternatively, the aperture element according to the present invention may comprise a pixelated optical element which may be adapted for allowing only a portion of the incident light beam to pass through while the other portions of the incident light beam are stopped and/or reflected, such as to one or more targets outside the optical sensor. In particular, the pixelated optical element may comprise at least one spatial light modulator, also abbreviated to "SLM", wherein the SLM may be adapted to modify at least one property of the incident light beam in a spatially resolved fashion, in particular to locally modify a transmissibility and/or reflectivity of the incident light beam. For this purpose, the SLM may comprise a matrix of pixels, wherein each of the pixels may individually be addressable in order to being capable of allowing a portion of the light beam passing through the respective pixel or not. Herein, the portion of the light beam which may not pass through the respective pixel may be absorbed and/or reflected, such as to one or more targets which may especially be provided for this purpose. Thus, the SLM may exhibit the capability of providing one or both type of aperture elements according to the present invention, i.e. the first aperture element and, preferably, the second aperture element. For this purpose, each of the pixels of the SLM may, in a particularly preferred embodiment, comprise an array of micro-lenses, wherein each of the micro-lenses may, preferably, be a tunable lens. Alternatively or in addition, each of the pixels of the SLM may, in a further particularly preferred embodiment, comprise a digital micro-mirror device (DMD), which comprises an array of micro-mirrors, wherein each of the micro-mirrors may, preferably, be a tunable mirror. The latter kind of spatially modulating an incident light beam may also be denominated as "Digital Light Processing®" or "DLP". Further, the camera can also comprise at least one modulator device which may be adapted for periodically controlling at least two of the pixels with different modulation frequencies.

Further, since each of the pixels of the spatial light modulator may be controllable individually, the adjustable area of the aperture element may be adjustable between different transmissibility and/or reflectivity states. Alternatively or in addition, a location of the aperture element, such as the location of the aperture element perpendicular to the optical axis of the camera, may further be adjustable. For these purposes, a selected number of individual pixels may be controlled, respectively, in a manner that they assume a state in which they allow the incident light beam to pass through the aperture area generated by addressing the selected number of the pixels. As described later in more detail, by adjusting the location of the aperture element with respect to the optical axis of the camera, objects which are not directly in front of the converging element may, thus, also be observable. Thereby, the visual range of the camera according to the present invention may be extended, in particular with respect to known telecentric lens systems or hypercentric lens systems.

Further, the camera according to the present invention comprises at least one optical sensor, i.e. a device capable of acquiring at least one optical image of one or more objects.

In a particularly preferred embodiment, the optical sensor may comprise at least one imaging device. As used herein, the term "imaging device" generally refers to a device which can generate a one-dimensional, a two-dimensional, or a three-dimensional image of the object or of a part thereof. Thus, the camera according to the present invention can be used as an IR camera or an RGB camera, i.e. a camera which is designed to deliver three basic colors which are designated as red, green, and blue, on three separate connections. Thus, as an example, the at least one imaging device may be or may comprise at least one imaging device selected from the group consisting of: a pixelated organic camera element, preferably a pixelated organic camera chip; a pixelated inorganic camera element, preferably a pixelated inorganic camera chip, more preferably a CCD-chip or CMOS-chip; a monochrome camera element, preferably a monochrome camera chip; a multicolor camera element, preferably a multicolor camera chip; a full-color camera element, preferably a full-color camera chip. The imaging device may be or may comprise at least one device selected from the group consisting of a monochrome imaging device, a multichrome imaging device and at least one full color imaging device. A multi-chrome imaging device and/or a full color imaging device may be generated by using filter techniques and/or by using intrinsic color sensitivity or other techniques, as the skilled person will recognize. Other embodiments of the imaging device are also possible.

Herein, the imaging device may be designed to image a plurality of partial regions of the object successively and/or simultaneously. By way of example, a partial region of the object can be a one-dimensional, a two-dimensional, or a three-dimensional region of the object which is delimited for example by a resolution limit of the imaging device and from which electromagnetic radiation emerges. In this context, imaging should be understood to mean that the electromagnetic radiation which emerges from the respective partial region of the object is fed into the imaging device, for example by means of the at least one optional transfer device of the camera. The electromagnetic rays can be generated by the object itself, for example in the form of a luminescent radiation. Alternatively or additionally, the at least one camera may comprise at least one illumination source for illuminating the object.

In particular, the imaging device can be designed to image sequentially, for example by means of a scanning method, in particular using at least one row scan and/or line scan, the plurality of partial regions sequentially. However, other embodiments are also possible, for example embodiments in which a plurality of partial regions is simultaneously imaged. The imaging device is designed to generate, during this imaging of the partial regions of the object, signals, preferably electronic signals, associated with the partial regions. The signal may be an analogue and/or a digital signal. By way of example, an electronic signal can be associated with each partial region. The electronic signals can accordingly be generated simultaneously or else in a temporally staggered manner. By way of example, during a row scan or line scan, it is possible to generate a sequence of electronic signals which correspond to the partial regions of the object, which are strung together in a line, for example. Further, the imaging device may comprise one or more signal processing devices, such as one or more filters and/or analogue-digital-converters for processing and/or preprocessing the electronic signals.

In a further embodiment, the optical sensor may further comprise at least one further spatial light modulator (SLM). As mentioned above, the SLM may comprise a matrix of pixels, wherein each of the pixels may individually be addressable. For the purpose of the optical sensor, the pixels of the spatial light modulator may be assigned to image pixels of the image in a manner that depth information for the image pixels may be determined by evaluating signal components. Consequently, depth information of the image pixels may be combined with the two-dimensional image as, for example, acquired by the imaging device in order to generate at least one three-dimensional image.

In a further, particularly preferred embodiment, the optical sensor may comprise at least one, preferably a single individual longitudinal optical sensor, which may, preferably, be located inside the housing of the camera. Herein, the longitudinal optical sensor has at least one sensor region, i.e. an area within the longitudinal optical sensor being sensitive to an illumination by an incident light beam. As used herein, the "longitudinal optical sensor" is generally a device which is designed to generate at least one longitudinal sensor signal in a manner dependent on an illumination of the sensor region by the light beam, wherein the longitudinal sensor signal, given the same total power of the illumination, is dependent, according to the so-called "FiP effect" on a beam cross-section of the light beam in the sensor region. The longitudinal sensor signal may, thus, generally be an arbitrary signal indicative of the longitudinal position, which may also be denoted as a depth. As an example, the longitudinal sensor signal may be or may comprise a digital and/or an analog signal. As an example, the longitudinal sensor signal may be or may comprise a voltage signal and/or a current signal. Additionally or alternatively, the longitudinal sensor signal may be or may comprise digital data. The longitudinal sensor signal may comprise a single signal value and/or a series of signal values. The longitudinal sensor signal may further comprise an arbitrary signal which is derived by combining two or more individual signals, such as by averaging two or more signals and/or by forming a quotient of two or more signals.

Further, given the same total power of the illumination, the longitudinal sensor signal may be dependent on the modulation frequency of the modulation of the illumination. For potential embodiments of the longitudinal optical sensor and the longitudinal sensor signal, including its dependency on the beam cross-section of the light beam within the sensor region and on the modulation frequency, reference may be made to the optical sensors as disclosed in one or more of WO 2012/110924 A1 and 2014/097181 A1. Within this respect, the camera can be designed, in particular, to detect at least two longitudinal sensor signals in the case of different modulations, in particular at least two longitudinal sensor signals at respectively different modulation frequencies. The evaluation device can be designed to generate the geometrical information from the at least two longitudinal sensor signals. As described in WO 2012/110924 A1 and WO 2014/097181 A1, it may be possible to resolve ambiguities and/or it is possible to take account of the fact that, for example, a total power of the illumination is generally unknown.

Specifically, the FiP effect may be observed in photo detectors, such as solar cells, more preferably in organic photodetectors, such as organic semiconductor detectors. Thus, the at least one longitudinal optical sensor may comprise at least one organic semiconductor detector and/or at least one inorganic semiconductor detector. Thus, generally, the optical sensor may comprise at least one semiconductor detector. Most preferably, the at least one semiconductor detector may be an organic semiconductor detector comprising at least one organic material. Thus, as used herein, an organic semiconductor detector is an optical detector comprising at least one organic material, such as an organic dye and/or an organic semiconductor material. Besides the at least one organic material, one or more further materials may be comprised, which may be selected from organic materials or inorganic materials. Thus, the organic semiconductor detector may be designed as an all-organic semiconductor detector comprising organic materials only, or as a hybrid detector comprising one or more organic materials and one or more inorganic materials. Still, other embodiments are feasible. Thus, combinations of one or more organic semiconductor detectors and/or one or more inorganic semiconductor detectors are feasible.

In a first embodiment, the semiconductor detector may be selected from the group consisting of an organic solar cell, a dye solar cell, a dye-sensitized solar cell, a solid dye solar cell, a solid dye-sensitized solar cell. As an example, specifically in case the at least one longitudinal optical sensor provide the above-mentioned FiP-effect, the at least one optical sensor or, in case a plurality of optical sensors is provided, one or more of the optical sensors, may be or may comprise a dye-sensitized solar cell (DSC), preferably a solid dye-sensitized solar cell (sDSC). As used herein, a DSC generally refers to a setup having at least two electrodes, wherein at least one of the electrodes is at least partially transparent, wherein at least one n-semiconducting metal oxide, at least one dye and at least one electrolyte or p-semiconducting material is embedded in between the electrodes. In an sDSC, the electrolyte or p-semiconducting material is a solid material. Generally, for potential setups of sDSCs which may also be used for one or more of the optical sensors within the present invention, reference may be made to one or more of WO 2012/110924 A1, US 2012/0206336 A1, WO 2014/097181 A1 or US 2014/0291480 A1.

In a further embodiment as disclosed in WO 2016/120392 A1, the full content of which is incorporated herein by reference, the transversal optical sensor according to the present invention may comprise at least one first electrode, at least one second electrode and a layer of a photoconductive material, particularly, embedded in between the first electrode and the second electrode. Herein, the photoconductive material may be an inorganic photoconductive material, preferably selected from the group consisting of selenium, a metal oxide, a group IV element or compound, a III-V compound, a II-VI compound, and a chalcogenide, wherein the chalcogenide may be selected from the group consisting of a sulfide chalcogenide, preferably lead sulfide (PbS); a selenide chalcogenide, preferably lead selenide (PbSe); a telluride chalcogenide, preferably cadmium telluride (CdTe); a ternary chalcogenide, preferably mercury cadmium telluride (HgCdTe), mercury zinc telluride (HgZnTe), or lead sulfide sulfoselenide (PbSSe); a quaternary chalcogenide; and a higher chalcogenide. Alternatively or in addition, the photoconductive material may be an organic photoconductive material, preferably selected from the group consisting of: a phthalocyanine, a metal phthalocyanine, a naphthalocyanine, a metal naphthalocyanine, a perylene, an anthracene, a pyrene, an oligothiophene, a polythiophene, a fullerene, a polyvinylcarbazole or a combination thereof. However, other materials which may exhibit the above-described FiP effect may also be feasible.

In a particular embodiment, such as when the different longitudinal optical sensors may exhibit different spectral sensitivities with respect to the incident light beam, the camera may comprise at least two longitudinal optical sensors, wherein each longitudinal optical sensor may be adapted to generate at least one longitudinal sensor signal. As an example, the sensor areas or the sensor surfaces of the longitudinal optical sensors may, thus, be oriented in parallel, wherein slight angular tolerances might be tolerable, such as angular tolerances of no more than 10°, preferably of no more than 5°. Herein, preferably all of the longitudinal optical sensors of the camera, which may, preferably, be arranged in form of a stack along the optical axis of the camera, may be transparent. Thus, the light beam may pass through a first transparent longitudinal optical sensor before impinging on the other longitudinal optical sensors, preferably subsequently. Thus, the light beam from the object may subsequently reach all longitudinal optical sensors present in the optical camera.

However, in order to being capable of acquiring a complete image of the at least one object, the presence of one or more longitudinal optical sensors within the camera may not be sufficient. Rather, the camera may, additionally, comprise at least one transversal optical sensor. As used herein, the term "transversal optical sensor" generally refers to a device which is adapted to determine a transversal position of the at least one light beam traveling from the object to the camera. With regard to the term "position", reference may be made to the definition above. Thus, preferably, the transversal position may be or may comprise at least one coordinate in at least one dimension perpendicular to an optical axis of the camera. As an example, the transversal position may be a position of a light spot generated by the light beam in a plane perpendicular to the optical axis, such as on a light-sensitive sensor surface of the transversal optical sensor. As an example, the position in the plane may be given in Cartesian coordinates and/or polar coordinates. Other embodiments are feasible. For potential embodiments of the transversal optical sensor, reference may be made to WO 2014/097181 A1. However, other embodiments are feasible.

Within this regard, the camera according to the present invention may comprise a stack of optical sensors as disclosed in WO 2014/097181 A1, in particular in a combination of one or more longitudinal optical sensors with one or more transversal optical sensors. However, according to the present invention, it may be advantageous that the stack of optical sensors may be a combination of a single individual longitudinal optical sensor with a single individual transversal optical sensor which may, additionally, be incorporated within a single optical sensor, such as in a hybrid sensor as described in WO 2016/092449 A1, the full content of which is herewith included by reference. However, an embodiment which may only comprise a single individual longitudinal optical sensor and no transversal optical sensor may still be advantageous, such as in a case in which determining solely the depth of the object may be desired.

The transversal optical sensor may provide at least one transversal sensor signal. Herein, the transversal sensor signal may generally be an arbitrary signal indicative of the transversal position. As an example, the transversal sensor signal may be or may comprise a digital and/or an analog signal. As an example, the transversal sensor signal may be or may comprise a voltage signal and/or a current signal.

Additionally or alternatively, the transversal sensor signal may be or may comprise digital data. The transversal sensor signal may comprise a single signal value and/or a series of signal values. The transversal sensor signal may further comprise an arbitrary signal which may be derived by combining two or more individual signals, such as by averaging two or more signals and/or by forming a quotient of two or more signals.

In a first embodiment similar to the disclosure according to WO 2012/110924 A1 and/or WO 2014/097181 A1, the transversal optical sensor may be a photo detector having at least one first electrode, at least one second electrode and at least one photovoltaic material, wherein the photovoltaic material may be embedded in between the first electrode and the second electrode. Thus, the transversal optical sensor may be or may comprise one or more photo detectors, such as one or more organic photodetectors and, most preferably, one or more dye-sensitized organic solar cells (DSCs, also referred to as dye solar cells), such as one or more solid dye-sensitized organic solar cells (s-DSCs). Thus, the detector may comprise one or more DSCs (such as one or more sDSCs) acting as the at least one transversal optical sensor and one or more DSCs (such as one or more sDSCs) acting as the at least one longitudinal optical sensor.

In a further embodiment as disclosed in WO 2016/120392 A1, the full content of which is incorporated herein by reference, the transversal optical sensor according to the present invention may comprise at least one first electrode, at least one second electrode and a layer of a photoconductive material, particularly, embedded in between the first electrode and the second electrode. Thus, the transversal optical sensor may comprise one of the photoconductive materials mentioned elsewhere herein, in particular a chalcogenide, preferably, lead sulfide (PbS) or lead selenide (PbSe). Again, the layer of the photoconductive material may comprise a composition selected from a homogeneous, a crystalline, a polycrystalline, a nanocrystalline and/or an amorphous phase. Preferably, the layer of the photoconductive material may be embedded in between two layers of a transparent conducting oxide, preferably comprising indium tin oxide (ITO) or magnesium oxide (MgO), which may serve as the first electrode and the second electrode. However, other materials may be feasible, in particular according to the desired transparency range within the optical spectrum.

Further, at least two electrodes may be present for recording the transversal optical signal. Preferably, the at least two electrodes may actually be arranged in the form of at least two physical electrodes, wherein each physical electrode may comprise an electrically conducting material, preferably a metallically conducting material, more preferred a highly metallically conducting material such as copper, silver, gold or an alloy or a composition comprising these kinds of materials. Herein, each of the at least two physical electrodes may, preferably, be arranged in a manner that a direct electrical contact between the respective electrode and the photoconductive layer in the optical sensor may be achieved, particularly in order to acquire the longitudinal sensor signal with as little loss as possible, such as due to additional resistances in a transport path between the optical sensor and the evaluation device.

Preferably, at least one of the electrodes of the transversal optical sensor may be a split electrode having at least two partial electrodes, wherein the transversal optical sensor may have a sensor area, wherein the at least one transversal sensor signal may indicate an x- and/or a y-position of the incident light beam within the sensor area, such as described in more detail in WO 2016/051323 A1, the full content of which is herewith included by reference.

Accordingly, the transversal optical sensor may comprise the sensor area, which, preferably, may be transparent to the light beam travelling from the object to the camera. The transversal optical sensor may, therefore, be adapted to determine a transversal position of the light beam in one or more transversal directions, such as in the x- and/or in the y-direction. For this purpose, the at least one transversal optical sensor may further be adapted to generate at least one transversal sensor signal. Thus, the evaluation device may be designed to generate at least one item of information on a transversal position of the object by evaluating the transversal sensor signal of the transversal optical sensor. Further, by combining the information on the transversal position of the object as acquired by using at least one of the transversal optical sensors with the information on the longitudinal position of the object as acquired by using at least one of the longitudinal optical sensors information concerning a three-dimensional position of the object may be obtained. This information may, thus, be used for the recording of a three-dimensional image of the object by using both kinds of information. The evaluation device may, thus, be especially defined to employ one or more of an object recognition algorithm, a feature recognition algorithm, an image transformation algorithm, and an image comparison algorithm, particularly in a manner that corresponding objects or features in the two pictures may be evaluated in order to obtain the information on the longitudinal position of the object in an efficient way.

In accordance with the present invention, the at least one optical sensor is further adapted to generate at least one first picture in a first setting of the camera and to generate at least one second picture in a second setting of the camera. As used herein, the term "setting" refers to a specific adjustment of the camera, in particular, with respect to aperture areas of the aperture elements as comprised within the camera. More particular, the first setting comprises a first specific adjustment of the camera in which the first aperture element and the second aperture element are adjusted in a manner that the first aperture area is larger than the second aperture area. Similarly, the second setting comprises a second specific adjustment of the camera in which the first aperture element and the second aperture element are adjusted in a manner that the second aperture area is larger than the first aperture area. As will explained below, the first setting may also be denominated as a "front mode" while the second setting may, in contrast hereto, also be denoted as a "normal mode".

As used herein, the term "front mode" refers to the first setting in which the aperture elements of the camera according to the present invention assume respective aperture areas that the converging element may be considered as a lens system which behaves in a manner that an entrance pupil, which is located in the direction of view in front of the lens system, is, additionally, located in front of the object. As generally used, the term "entrance pupil" refers to an optical image of the aperture as recorded in front of the lens system, i.e. in a direction of the lens system being directed towards the impinging light beam, also denominated as "object space". Similarly, the image of the aperture recorded behind the lens system, i.e. in the direction of the lens system which is directed along the direction of the impinging light beam, also denoted as "image space", is usually denominated as the "exit pupil". Therefore, in a pinhole camera in which no lens may be present in front of the aperture stop, location and size of the entrance pupil are identical to the location and the size of the aperture stop. Placing one or more optical elements in front of the pinhole may result in a magnified image or in a diminished image, respectively, depending on the optical properties of the optical elements with respect to magnification.

However, the entrance pupil may be located in the direction of view in front of both the lens system and the object. This is particular contrast to a normal lens, which may also be denominated as an "entocentric lens", where the entrance pupil is located between the lens system and the object.

In a particularly preferred embodiment, the entrance pupil may, thus, be located in the direction of view at infinity, which may be accomplished by using an object-space telecentric lens. For this purpose, the first aperture element may, preferably, be placed in a focal plane within an image space of the lens. As generally used, the term "focal plane" refers to a plane arranged perpendicular to the optical axis at a position where a focus of the lens is located. As a result, an orthographic projection of the object can be generated. In other words, oblique rays which might pass through the center of the aperture which is located at the optical axis may, thus, be parallel to the optical axis in front of the lens system. As a result, the magnification of the telecentric lens comprising the entrance pupil at infinity turns out to be independent of the distance between the object and the telecentric lens. Consequently, this property enables the object-space telecentric lens to be used in metrology applications, such as in machine vision or optical lithography. However, this particular advantage of the object-space telecentric lens is acquired on cost of the space which may be imaged by using the telecentric lens. Thus, the telecentric lens is required to be as large as the object to be imaged by the telecentric lens. In other words, the size of the object from which an image may be recorded by using the telecentric lens is, thus, limited by the size of the telecentric lens.

In a first example, the telecentric lens may be obtained by simply placing the aperture stop at one of the focal points of the lens. As an example, the object-space telecentric lens is obtained by placing the aperture stop at the focal point of the lens which is located behind the lens as defined from an incident light beam which impinges onto the lens. However, in general, the telecentric lens may be shaped as a compound lens. A particularly preferred example of the compound lens which may be employed for a function of the object-space telecentric lens is depicted in the figures as described below in more detail.

In contrast thereto, the normal mode as used in the second setting refers to a setting of the camera according to the present invention in which the aperture elements of the camera assume respective aperture areas that the converging element may be considered as a lens system which does not behave as the telecentric lens. Accordingly, the magnification of the lens system turns out to be dependent of the distance between the object and the lens as known from normal cameras.

Consequently, by recording the first picture in which the magnification of the lens system does not depend on the distance between the object and the camera (first setting in front mode), by recording the second picture in which the magnification of the lens system actually depends on the distance between the object and the camera (second setting in normal mode), and by comparing the first picture and the second picture the image of the one or more objects is obtained. For this purpose, it may particularly be advantageous to perform a comparison of first sizes of one or more objects as comprised within the first picture with second sizes of the one or more objects also comprised within the second picture and to derive therefrom the distances of the one or more objects from the mentioned comparison, in particular, by using a specifically designed evaluation device.

In an alternative embodiment, the entrance pupil may, in the direction of view, still be located in front of both the lens system and the object but not at infinity, which may be accomplished by using a hypercentric lens, which may also be denominated as a "pericentric lens". For this purpose, the first aperture element may be placed off the focal plane within the image space of the lens. As generally used, the hypercentric lens is designed in a manner that the light beams are converging towards the object, which is in contrast to both the telecentric lens, where the rays stay parallel, and the normal lens or entocentric lens, where the light beams behave in a diverging fashion. As a result, the entrance pupil can be perceived from the object space as moving around a peripheral zone of the lens. Consequently, a single image comprising all features of the object may be obtained, thus, allowing a fast, reliable, and simultaneous analysis of multiple features of an object. This property enables the hypercentric lens to be used in machine vision, particularly frequently for inspecting consumer goods in the beverage, pharmaceutical and cosmetics industries.

As already mentioned above, the visual range of the camera according to the present invention may be extended, in particular with respect to known telecentric or hypercentric lens systems, by additionally adjusting the location of the aperture element with respect to the optical axis of the camera between the first setting and the second setting of the camera or within the first setting and/or the second setting of the camera. As used herein, the term "adjusting the location of the aperture element" may refer to a moving of the aperture element between two exposures taken by the camera. Consequently, objects which are not directly in front of the converging element may also be observable. In a preferred example, at least one first picture may be taken in the normal mode while a series of the second pictures may be taken in the front mode. Herein, in each of the second pictures the location of the aperture element with respect to the optical axis of the camera may assume a different value while in each of the first pictures the location of the aperture element with respect to the optical axis of the camera may be retained. Thereby, it may, thus, be possible to alter the direction of view between the different second pictures as taken in the front mode. As a result, observing an extended visual range may be feasible, which may particularly be useful for tracking of the at least one object by the camera.

Thus, the camera according to the present invention comprises at least one evaluation device which is designed to generate at least one image of the at least one object by comparing the at least one first picture and the at least one second picture. As used herein, the term "evaluation device" generally refers to an arbitrary device designed to generate the at least one image of the at least one object, in particular, the at least one three-dimensional image of the at least one object, especially by taking into account the items of information on the position of the object. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the sensor signals, such as one or more AD-converters and/or one or more filters. As used herein, the sensor signal may generally refer to the sensor signals of the optical sensor as used within the camera. Further, the evaluation device may comprise one or more data storage devices. Further, as outlined above, the evaluation device may comprise one or more interfaces, such as one or more wireless interfaces and/or one or more wire-bound interfaces.

The at least one evaluation device may be adapted to perform at least one computer program, such as at least one computer program performing or supporting the step of generating the items of information. As an example, one or more algorithms may be implemented which, by using the sensor signals as input variables, may perform a comparison between the first picture and the second picture.

The evaluation device may particularly comprise at least one data processing device, in particular an electronic data processing device, which can be designed to generate the items of information by evaluating the sensor signals. Thus, the evaluation device is designed to use the sensor signals as input variables and to generate the at least one image of the object by processing these input variables. The processing can be done in parallel, subsequently or even in a combined manner. The evaluation device may use an arbitrary process for generating these items of information, such as by calculation and/or using at least one stored and/or known relationship. Besides the sensor signals, one or a plurality of further parameters and/or items of information can influence said relationship, for example at least one item of information about a modulation frequency. The relationship can be determined or determinable empirically, analytically or else semi-empirically. Particularly preferably, the relationship comprises at least one calibration curve, at least one set of calibration curves, at least one function or a combination of the possibilities mentioned. One or a plurality of calibration curves can be stored for example in the form of a set of values and the associated function values thereof, for example in a data storage device and/or a table. Alternatively or additionally, however, the at least one calibration curve can also be stored for example in parameterized form and/or as a functional equation. Separate relationships for processing the sensor signals into the images may be used. Alternatively, at least one combined relationship for processing the sensor signals is feasible. Various possibilities are conceivable and can also be combined.

The camera has, as described above, at least one evaluation device. In particular, the at least one evaluation device can also be designed to completely or partly control or drive the camera, for example by the evaluation device being designed to control at least one illumination source and/or to control at least one modulation device of the camera. The evaluation device can be designed, in particular, to carry out at least one measurement cycle in which one or a plurality of sensor signals, such as a plurality of sensor signals, are picked up, for example a plurality of sensor signals of successively at different modulation frequencies of the illumination.

The evaluation device is designed, as described above, to generate at least one image of the object by evaluating the at least one sensor signal. The position of the object can be static or may even comprise at least one movement of the object, for example a relative movement between the camera or parts thereof and the object or parts thereof. In this case, a relative movement can generally comprise at least one linear movement and/or at least one rotational movement. Items of movement information can for example also be obtained by comparison of at least two items of information picked up at different times, such that for example at least one item of location information can also comprise at least one item of velocity information and/or at least one item of acceleration information, for example at least one item of information about at least one relative velocity between the object or parts thereof and the camera or parts thereof.

As mentioned above, placing the first aperture element in the focal plane within the image space of the lens in order to obtain the object-space telecentric lens, may allow obtaining the image of the one or more objects by recording the first picture in the first setting in the front mode, in which the magnification of the lens system does not depend on the distance between the object and the camera, by recording the second picture in the second setting in the normal mode, in which the magnification of the lens system depends on the distance between the object and the camera, and by comparing the first picture and the second picture. For this purpose, the evaluation device is designed to generate the image of the objects by comparing the first picture and the second picture. Preferably, the evaluation device may, thus, specifically be designed to perform a comparison of the first sizes of the objects comprised in the first picture with the second sizes of the objects also comprised in the second picture and to derive the distances of the objects from this comparison. By way of example, the comparison may be performed by applying appropriate methods for identifying the objects in the respective pictures and mutual correspondences between the same objects in both pictures.

In the further embodiment as described above, in which the optical sensor may comprise at least one further spatial light modulator (SLM), the evaluation device may, further, be adapted to assign the pixels of the spatial light modulator to image pixels of the image, wherein the evaluation device may, further, be adapted to determine a depth information for the image pixels by evaluating the signal components. Thus, the evaluation device may be adapted to combine depth information of the image pixels with the two-dimensional image as, for example, recorded by the imaging device, in order to generate at least one three-dimensional image.

Further embodiments of the present invention referred to the nature of the light beam which propagates from the object to the camera. As used herein, the term "light" generally refers to electromagnetic radiation in one or more of the visible spectral range, the ultraviolet spectral range and the infrared spectral range. Therein, the term visible spectral range generally refers to a spectral range of 380 nm to 780 nm. The term infrared (IR) spectral range generally refers to electromagnetic radiation in the range of 780 nm to 1000 µm, wherein the range of 780 nm to 1.4 µm is usually denominated as the near infrared (NIR) spectral range, and the range from 15 µm to 1000 µm as the far infrared (FIR) spectral range. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term "light beam" generally refers to an amount of light emitted into a specific direction. Thus, the light beam may be a bundle of the light rays having a predetermined extension in a direction perpendicular to a direction of propagation of the light beam. Preferably, the light beam may be or may comprise one or more Gaussian light beams which may be characterized by one or more Gaussian beam parameters, such as one or more of a beam waist, a Rayleigh-length or any other beam parameter or combination of beam parameters suited to characterize a development of a beam diameter and/or a beam propagation in space.

The light beam might be admitted by the object itself, i.e. might originate from the object. Additionally or alternatively, another origin of the light beam is feasible. Thus, as will be outlined in further detail below, one or more illumination sources might be provided which illuminate the object, such as by using one or more primary rays or beams, such as one or more primary rays or beams having a predetermined characteristic. In the latter case, the light beam propagating from the object to the camera might be a light beam which is reflected by the object and/or a reflection device connected to the object.

In case a FiP sensor may be used, the at least one longitudinal sensor signal, given the same total power of the illumination by the light beam, is, according to the FiP effect, dependent on a beam cross-section of the light beam in the sensor region of the at least one longitudinal optical sensor. As used herein, the term beam cross-section generally refers to a lateral extension of the light beam or a light spot generated by the light beam at a specific location. In case a circular light spot is generated, a radius, a diameter or a Gaussian beam waist or twice the Gaussian beam waist may function as a measure of the beam cross-section. In case non-circular light-spots are generated, the cross-section may be determined in any other feasible way, such as by determining the cross-section of a circle having the same area as the non-circular light spot, which is also referred to as the equivalent beam cross-section. Within this regard, it may be possible to employ the observation of an extremum, i.e. a maximum or a minimum, of the longitudinal sensor signal, inn particular a global extremum, under a condition in which the corresponding material, such as a photovoltaic material, may be impinged by a light beam with the smallest possible cross-section, such as when the material may be located at or near a focal point as affected by an optical lens. In case the extremum is a maximum, this observation may be denominated as the positive FiP-effect, while in case the extremum is a minimum, this observation may be denominated as the negative FiP-effect.

Thus, irrespective of the material actually comprised in the sensor region but given the same total power of the illumination of the sensor region by the light beam, a light beam having a first beam diameter or beam cross-section may generate a first longitudinal sensor signal, whereas a light beam having a second beam diameter or beam-cross section being different from the first beam diameter or beam cross-section generates a second longitudinal sensor signal being different from the first longitudinal sensor signal. As described in WO 2012/110924 A1, by comparing the longitudinal sensor signals, at least one item of information on the beam cross-section, specifically on the beam diameter, may be generated. Accordingly, the longitudinal sensor signals generated by the longitudinal optical sensors may be compared, in order to gain information on the total power and/or intensity of the light beam and/or in order to normalize the longitudinal sensor signals and/or the at least one item of information on the longitudinal position of the object for the total power and/or total intensity of the light beam. Thus, as an example, a maximum value of the longitudinal optical sensor signals may be detected, and all longitudinal sensor signals may be divided by this maximum value, thereby generating normalized longitudinal optical sensor signals, which, then, may be transformed by using the above-mentioned known relationship, into the at least one item of longitudinal information on the object. Other ways of normalization are feasible, such as a normalization using a mean value of the longitudinal sensor signals and dividing all longitudinal sensor signals by the mean value. Other options are possible. This embodiment may, particularly, be used by the evaluation device in order to resolve an ambiguity in the known relationship between a beam cross-section of the light beam and the longitudinal position of the object. Thus, even if the beam properties of the light beam propagating from the object to the optical sensor are known fully or partially, it is known that, in many beams, the beam cross-section narrows before reaching a focal point and, afterwards, widens again. Thus, before and after the focal point in which the light beam has the narrowest beam cross-section, positions along the axis of propagation of the light beam occur in which the light beam has the same cross-section. Thus, as an example, at a distance z0 before and after the focal point, the cross-section of the light beam is identical. Thus, in case the optical sensor only comprises a single longitudinal optical sensor, a specific cross-section of the light beam might be determined, in case the overall power or intensity of the light beam is known. By using this information, the distance z0 of the respective longitudinal optical sensor from the focal point might be determined. However, in order to determine whether the respective longitudinal optical sensor may be located before or behind the focal point, additional information is required, such as a history of movement of the object and/or the optical sensor and/or information on whether the optical sensor is located before or behind the focal point.

In case one or more beam properties of the light beam propagating from the object to the optical sensor are known, the at least one item of information on the longitudinal position of the object may thus be derived from a known relationship between the at least one longitudinal sensor signal and a longitudinal position of the object. The known relationship may be stored in the evaluation device as an algorithm and/or as one or more calibration curves. As an example, specifically for Gaussian beams, a relationship between a beam diameter or beam waist and a position of the object may easily be derived by using the Gaussian relationship between the beam waist and a longitudinal coordinate. The evaluation device may, thus, be adapted to compare the beam cross-section and/or the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

As mentioned above, in addition to the at least one longitudinal coordinate of the object, at least one transversal coordinate of the object may be determined. Thus, generally, the evaluation device may further be adapted to determine at least one transversal coordinate of the object by determining a position of the light beam on the at least one transversal optical sensor, which may be a pixelated, a segmented or a large-area transversal optical sensor, as further outlined also in WO 2014/097181 A1.

Further, the camera according to the present invention may comprise at least one modulation device may be is capable of generating at least one modulated light beam traveling from the object to the camera and, thus, may modulate the illumination of the object and/or at least one sensor region of the optical sensor, such as at least one sensor region of the at least one longitudinal optical sensor. Preferably, the modulation device may be employed for generating a periodic modulation, such as by employing a periodic beam interrupting device. By way of example, the optical sensor can be designed to bring about a modulation of the illumination of the object and/or at least one sensor region of the optical sensor, such as at least one sensor region of the at least one longitudinal optical sensor, with a frequency of 0.05 Hz to 1 MHz, such as 0.1 Hz to 10 kHz. Within this regard, the modulation of the illumination is understood to mean a process in which a total power of the illumination is varied, preferably periodically, in particular with a single modulation frequency or, simultaneously and/or consecutively, with a plurality of modulation frequencies. In particular, a periodic modulation can be effected between a maximum value and a minimum value of the total power of the illumination. Herein, the minimum value can be 0, but can also be >0, such that, by way of example, complete modulation does not have to be effected. In a particularly preferential manner, the at least one modulation may be or may comprise a periodic modulation, such as a sinusoidal modulation, a square modulation, or a triangular modulation of the affected light beam. Further, the modulation may be a linear combination of two or more sinusoidal functions, such as a squared sinusoidal function, or a $\sin(t^2)$ function, where t denotes time. In order to demonstrate particular effects, advantages and feasibility of the present invention the square modulation is, in general, employed herein as an exemplary shape of the modulation which representation is, however, not intended to limit the scope of the present invention to this specific shape of the modulation. By virtue of this example, the skilled person may rather easily recognize how to adapt the related parameters and conditions when employing a different shape of the modulation.

The modulation can be effected for example in a beam path between the object and the optical sensor, for example by the at least one modulation device being arranged in said beam path. Alternatively or additionally, however, the modulation can also be effected in a beam path between an optional illumination source as described below for illuminating the object and the object, for example by the at least one modulation device being arranged within said beam path. A combination of these possibilities may also be conceivable. For this purpose, the at least one modulation device can comprise, for example, a beam chopper or some other type of periodic beam interrupting device, such as comprising at least one interrupter blade or interrupter wheel, which preferably rotates at constant speed and which can, thus, periodically interrupt the illumination. Alternatively or additionally, however, it is also possible to use one or a plurality of different types of modulation devices, for example modulation devices based on an electro-optical effect and/or an acousto-optical effect. Once again alternatively or additionally, the at least one optional illumination source itself can also be designed to generate a modulated illumination, for example by the illumination source itself having a modulated intensity and/or total power, for example a periodically modulated total power, and/or by said illumination source being embodied as a pulsed illumination source, for example as a pulsed laser. Thus, by way of example, the at least one modulation device can also be wholly or partly integrated into the illumination source. Further, alternatively or in addition, the camera may comprise at least one optional transfer device, such as a tunable lens, which may itself be designed to modulate the illumination, for example by modulating, in particular by periodically modulating, the total intensity and/or total power of an incident light beam which impinges the at least one transfer device in order to traverse it before impinging the at least one longitudinal optical sensor. Various possibilities are feasible.

Light emerging from the object can originate in the object itself, but can also optionally have a different origin and propagate from this origin to the object and subsequently toward the optical sensors. The latter case can be affected for example by at least one illumination source being used. The illumination source can be embodied in various ways. Thus, the illumination source can be for example part of the camera, however, arranged outside the camera housing, in particular, as a separate light source. The illumination source can be arranged separately from the object and illuminate the object from a distance. Alternatively or additionally, the illumination source can also be connected to the object or even be part of the object, such that, by way of example, the electromagnetic radiation emerging from the object can also be generated directly by the illumination source. By way of example, at least one illumination source can be arranged on and/or in the object and directly generate the electromagnetic radiation by means of which the sensor region is illuminated. This illumination source can for example be or comprise an ambient light source and/or may be or may comprise an artificial illumination source. By way of example, at least one infrared emitter and/or at least one emitter for visible light and/or at least one emitter for ultraviolet light can be arranged on the object. By way of example, at least one light emitting diode and/or at least one laser diode can be arranged on and/or in the object. The illumination source can comprise in particular one or a plurality of the following illumination sources: a laser, in particular a laser diode, although in principle, alternatively or additionally, other types of lasers can also be used; a light emitting diode; an incandescent lamp; a neon light; a flame source; an organic light source, in particular an organic light emitting diode; a structured light source. Alternatively or additionally, other illumination sources can also be used. It is particularly preferred if the illumination source is designed to generate one or more light beams having a Gaussian beam profile, as is at least approximately the case for example in many lasers. For further potential embodiments of the optional illumination source, reference may be made to one of WO 2012/110924 A1 and WO 2014/097181 A1. Still, other embodiments are feasible.

The at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 15 micrometers. Most preferably, the at least one illumination source is adapted to emit light in the visible spectral range, preferably in the range of 500 nm to 780 nm, most preferably at 650 nm to 750 nm or at 690 nm to 700 nm. Herein, it is particularly preferred when the illumination source may exhibit a spectral range which may be related to the spectral sensitivities of the longitudinal sensors, particularly in a manner to ensure that the longitudinal sensor which may be illuminated by the respective illumination source may provide a sensor signal with a high intensity which may, thus, enable a high-resolution evaluation with a sufficient signal-to-noise-ratio.

In a further aspect of the present invention, a tracking system for tracking the position of at least one movable object is provided. As used herein, a tracking system is a device which is adapted to gather information on a series of past positions of the at least one object or at least one part of an object. Additionally, the tracking system may be adapted to provide information on at least one predicted future position of the at least one object or the at least one part of the object. The tracking system may have at least one track controller, which may fully or partially be embodied as an electronic device, preferably as at least one data processing device, more preferably as at least one computer or microcontroller. Again, the at least one track controller may comprise the at least one evaluation device and/or may be part of the at least one evaluation device and/or might fully or partially be identical to the at least one evaluation device. Further, the tracking system may comprise at least one beacon device connectable to the object, in particular one or more beacon devices as described in WO 2014/097181 A1 in more detail.

The tracking system comprises at least one camera according to the present invention, such as at least one camera as disclosed in one or more of the embodiments listed above and/or as disclosed in one or more of the embodiments below. The tracking system further comprises at least one track controller. The tracking system may comprise one, two or more cameras, particularly two or more identical cameras, which allow for a reliable acquisition of depth information about the at least one object in an overlapping volume between the two or more cameras. The track controller is adapted to track a series of positions of the object, each position comprising at least one item of information on a position of the object at a specific point in time. For this purpose, preferably a camera having an extended visual range as described above, in particular by generating a series of second pictures at different locations of the second aperture element perpendicular to the optical axis of the camera, may be employed.

In a further aspect of the present invention, a method for recording at least one image of at least one object is disclosed. The method preferably may make use of at least one camera according to the present invention, such as of at least one camera according to one or more of the embodiments disclosed above or disclosed in further detail below. Thus, for optional embodiments of the method, reference might be made to the description of the various embodiments of the camera.

The method comprises the following steps, which may be performed in the given order or in a different order. Further, additional method steps might be provided which are not listed. Further, two or more or even all of the method steps might be performed simultaneously, at least partially. Further, two or more or even all of the method steps might be performed twice or even more than twice, repeatedly.

The method according to the present invention comprises the following steps:
  generating at least one first picture in a first setting comprising a first aperture area of at least one first aperture element exceeding a second aperture area of at least one second aperture element and generating at least one second picture in a second setting comprising the second aperture area exceeding the first aperture area by using at least one optical sensor being adapted for receiving the light beam, wherein the light beam is converged by passing through a converging element to travel on a beam path to the at least one optical sensor, wherein the first aperture element is located in the beam path between the converging element and the optical sensor, and wherein the second aperture element is located in the beam path between the first aperture element and the optical sensor; and
  generating at least one image of at least one object by comparing the at least one first picture and the at least one second picture.

In particular, the first picture may be generated in a first setting of the camera while the second picture may be generated in a second setting of the camera. Herein, the first setting may be recorded in a front mode of the camera, i.e. in a first specific adjustment of the camera in which the first aperture element and the second aperture element are adjusted in a manner that the first aperture area exceeds the second aperture area. Similarly, the second setting may be recorded in a normal mode of the camera, i.e. in a second specific adjustment of the camera in which the first aperture element and the second aperture element are adjusted in a manner that the second aperture area exceeds the first aperture area. Subsequently or in parallel to the recording, the first picture and the second picture may be compared with each other for acquiring the image of the at least one object, in particular, a three-dimensional image of the object, preferably by employing an evaluation device being adapted for this purpose.

In a preferred embodiment, the first aperture element and/or the second aperture element may comprise an adjustable aperture stop, wherein, for each aperture element, the aperture area of the aperture stop may be adjusted in order to obtain the respective aperture areas.

In an alternative embodiment, the aperture element, preferably the second aperture element, may comprise at least one spatial light modulator which may be adapted for modifying at least one property of the light beam in a spatially resolved fashion. Herein, the spatial light modulator has a matrix of pixels, wherein each pixel may be controlled individually in order to modify the at least one optical property of a portion of the light beam passing the pixel before the light beam reaches the at least one optical sensor. In particular, the pixels of the spatial light modulator can be controlled in a manner that the adjustable area of the aperture element is adjusted.

Alternatively or in addition, the location of the aperture element perpendicular to the optical axis may also be adjusted. In particular, by adjusting the location of the second aperture element perpendicular to the optical axis a specific object which may not be directly located in front of the converging element can also be observed. Herein, preferably a series of two or more second pictures may be generated, wherein the location of the second aperture element perpendicular to the optical axis may be adjusted between generating the different second pictures, whereby the direction of view between the different second pictures taken in the front mode may be altered, thus, allowing observing an extended visual range.

For further details concerning the method according to the present invention, reference may be made to the description of the camera as provided above and/or below.

In a further aspect of the present invention, a use of a camera according to the present invention is disclosed. Therein, the camera may be used for a purpose of an imaging application or camera application, in particular for a three-dimensional imaging application or a three-dimensional camera application, preferably, for a purpose of use selected from the group consisting of: a position measurement, in particular in traffic technology; an entertainment application; a security application; a human-machine interface application; a tracking application; a scanning application; a stereoscopic vision application; a photography application; an imaging application or camera application; a mapping application for generating maps of at least one space; a homing or tracking beacon camera for vehicles; a position measurement of objects with a thermal signature (hotter or colder than background); a machine vision application; a robotic application.

Thus, generally, the devices according to the present invention, such as the camera, may be applied in various fields of uses. Specifically, the camera may be applied for a purpose of use, selected from the group consisting of: a position measurement in traffic technology; an entertainment application; a security application; a human-machine interface application; a tracking application; a photography application; a cartography application; a mapping application for generating maps of at least one space; a homing or tracking beacon camera for vehicles; a mobile application; a webcam; an audio device; a Dolby surround audio system; a computer peripheral device; a gaming application; a camera or video application; a surveillance application; an automotive application; a transport application; a logistics application; a vehicle application; an airplane application; a ship application; a spacecraft application; a robotic application; a medical application; a sports' application; a building application; a construction application; a manufacturing application; a machine vision application; a use in combination with at least one sensing technology selected from time-of-flight camera, radar, Lidar, ultrasonic sensors, or interferometry. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

Thus, firstly, the devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning, or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences. Further, devices according to the present invention may be used to recognize or track hands, arms, or objects used in a virtual or augmented reality application, especially when wearing head mounted displays.

Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at. Further, devices according to the present invention may be used to explore a room, boundaries, obstacles, in connection with a virtual or augmented reality application, especially when wearing a head-mounted display.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analogue electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound cameras. The devices according to the present invention may further be combined with an active infrared light source to allow detection in low light surroundings. The devices according to the present invention are generally advantageous as compared to active camera systems, specifically since the devices according to the present invention avoid actively sending signals which may be detected by third parties, as is the case e.g. in radar applications, ultrasound applications, LIDAR or similar active devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers. Further, the devices according to the present invention may be used in public spaces or crowded spaces to detect potentially hazardous activities such as commitment of crimes such as theft in a parking lot or unattended objects such as unattended baggage in an airport.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. Further, the devices according to the present invention generally may be used for focus/autofocus devices, such as autofocus cameras.

Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, traffic sign detection, traffic sign recognition, lane recognition, rear cross traffic alert, light source recognition for adapting the head light intensity and range depending on approaching traffic or vehicles driving ahead, adaptive front-lighting systems, automatic control of high beam head lights, adaptive cut-off lights in front light systems, glare-free high beam front lighting systems, marking animals, obstacles, or the like by headlight illumination, rear cross traffic alert, and other driver assistance systems, such as advanced driver assistance systems, or other automotive and traffic applications. Further, devices according to the present invention may be used in driver assistance systems which may, particularly, be adapted for anticipating maneuvers of the driver beforehand for collision avoidance. Further, the devices according to the present invention can also be used for velocity and/or acceleration measurements, such as by analyzing a first and second time-derivative of position information gained by using the camera according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. Herein, the use of an airbag may, especially, be prevented in a case in which the passenger may be located within the vehicle in a manner that a use of the airbag might cause an injury, in particular a severe injury, with the passenger. Further, in vehicles such as cars, trains, planes or the like, especially in autonomous vehicles, devices according to the present invention may be used to determine whether a driver pays attention to the traffic or is distracted, or asleep, or tired, or incapable of driving, such as due to the consumption of alcohol or other drugs.

In these or other applications, generally, the devices according to the present invention may be used as stand-alone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software. Thus, signals and data as provided by the devices according to the present invention typically are readily processable and, therefore, generally require lower calculation power than established stereovision systems such as LIDAR. Given the low space demand, the devices according to the present invention such as cameras may be placed at virtually any place in a vehicle, such as on or behind a window screen, on a front hood, on bumpers, on lights, on mirrors or other places and the like. The camera according to the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one camera according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention may generally be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may generally be used for vision, in particular for vision under difficult visibility conditions, such as in night vision, fog vision, or fume vision. For achieving this purpose, the optical sensor may be sensitive at least within a wavelength range in which small particles, such as particles being present in smoke or fume, or small droplets, such as droplets being present in fog, mist or haze, may not reflect an incident light beam or only a small partition thereof. As generally known, the reflection of the incident light beam may be small or negligent in a case in which the wavelength of the incident beam exceeds the size of the particles or of the droplets, respectively. Further, might vision may be enabled by detecting thermal radiation being emitted by a bodies and objects. Thus, the optical sensor may particularly be sensitive within the infrared (IR) spectral range, preferably within the near infrared (NIR) spectral range, may, thus, allow good visibility even at night, in fume, smoke, fog, mist, or haze.

Further, the devices according to the present invention may be used in the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. This may allow an instant overlay of the position of a medical device, such as an endoscope or a scalpel, with results from medical imaging, such as obtained from magnetic resonance imaging, x-ray imaging, or ultrasound imaging. These applications are specifically valuable e.g. in medical treatments where precise location information is important such as in brain surgery and long-distance diagnosis and tele-medicine. Further, the devices according to the present invention may be used in 3D-body scanning. Body scanning may be applied in a medical context, such as in dental surgery, plastic surgery, bariatric surgery, or cosmetic plastic surgery, or it may be applied in the context of medical diagnosis such as in the diagnosis of myofascial pain syndrome, cancer, body dysmorphic disorder, or further diseases. Body scanning may further be applied in the field of sports to assess ergonomic use or fit of sports equipment.

Body scanning may further be used in the context of clothing, such as to determine a suitable size and fitting of clothes. This technology may be used in the context of tailor-made clothes or in the context of ordering clothes or shoes from the internet or at a self-service shopping device such as a micro kiosk device or customer concierge device. Body scanning in the context of clothing is especially important for scanning fully dressed customers.

Further, the devices according to the present invention may be used in the context of people counting systems, such as to count the number of people in an elevator, a train, a bus, a car, or a plane, or to count the number of people passing a hallway, a door, an aisle, a retail store, a stadium, an entertainment venue, a museum, a library, a public location, a cinema, a theater, or the like. Further, the 3D-function in the people counting system may be used to obtain or estimate further information about the people that are counted such as height, weight, age, physical fitness, or the like. This information may be used for business intelligence metrics, and/or for further optimizing the locality where people may be counted to make it more attractive or safe. In a retail environment, the devices according to the present invention in the context of people counting may be used to recognize returning customers or cross shoppers, to assess shopping behavior, to assess the percentage of visitors that make purchases, to optimize staff shifts, or to monitor the costs of a shopping mall per visitor. Further, people counting systems may be used for anthropometric surveys. Further, the devices according to the present invention may be used in public transportation systems for automatically charging passengers depending on the length of transport. Further, the devices according to the present invention may be used in playgrounds for children, to recognize injured children or children engaged in dangerous activities, to allow additional interaction with playground toys, to ensure safe use of playground toys or the like.

Further, the devices according to the present invention may be used in construction tools, such as a range meter that determines the distance to an object or to a wall, to assess whether a surface is planar, to align or objects or place objects in an ordered manner, or in inspection cameras for use in construction environments or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing, golf, car racing, laser tag, battlefield simulation etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

Further, the devices according to the present invention may be used in the field of auto racing or car driver training or car safety training or the like to determine the position of a car or the track of a car, or the deviation from a previous track or an ideal track or the like.

The devices according to the present invention may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects and humans better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used to monitor the filling level of tanks, silos etc. Further, devices according to the present invention may be used to inspect complex products for missing parts, incomplete parts, loose parts, low quality parts, or the like, such as in automatic optical inspection, such as of printed circuit boards, inspection of assemblies or sub-assemblies, verification of engineered components, engine part inspections, wood quality inspection, label inspections, inspection of medical devices, inspection of product orientations, packaging inspections, food pack inspections, or the like.

Further, the devices according to the present invention may be used in vehicles, trains, airplanes, ships, spacecraft and other traffic applications. Thus, besides the applications mentioned above in the context of traffic applications, passive tracking systems for aircraft, vehicles and the like may be named. The use of the one camera according to the present invention for monitoring the speed and/or the direction of moving objects is feasible. Specifically, the tracking of fast moving objects on land, sea and in the air including space may be named. The camera according to the present invention specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention are generally useful and advantageous due to a low calculation power required, an instant response and due to a passive nature of the detection system which is, generally, more difficult to detect and to disturb as compared to active systems, like e.g. radar. The devices according to the present invention are particularly useful but not limited to e.g. speed control and air traffic control devices. Further, the devices according to the present invention may be used in automated tolling systems for road charges.

The devices according to the present invention may, generally, be used in passive applications. Passive applications include guidance for ships in harbors or in dangerous areas, and for aircraft when landing or starting. Wherein, fixed, known active targets may be used for precise guidance. The same can be used for vehicles driving on dangerous but well defined routes, such as mining vehicles. Further, the devices according to the present invention may be used to detect rapidly approaching objects, such as cars, trains, flying objects, animals, or the like. Further, the devices according to the present invention can be used for detecting velocities or accelerations of objects, or to predict the movement of an object by tracking one or more of its position, speed, and/or acceleration depending on time.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more devices according to the present invention with one or more IR or VIS light sources is possible. A combination of a camera according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racquet, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention may be used to detect and or track objects that emit light by themselves, such as due to high temperature or further light emission processes. The light emitting part may be an exhaust stream or the like. Further, the devices according to the present invention may be used to track reflecting objects and analyze the rotation or orientation of these objects.

Further, the devices according to the present invention may generally be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or air. Potential fields of application may be construction, cartography, real estate management, land surveying or the like. As an example, the devices according to the present invention may be used in vehicles capable of flight, such as drones or multicopters, in order to monitor buildings, chimneys, production sites, agricultural production environments such as fields, production plants, or landscapes, to support rescue operations, to support work in dangerous environments, to support fire brigades in a burning location indoors or outdoors, to find or monitor one or more persons, animals, or moving objects, or for entertainment purposes, such as a drone following and recording one or more persons doing sports such as skiing or cycling or the like, which could be realized by following a helmet, a mark, a beacon device, or the like. Devices according to the present invention could be used recognize obstacles, follow a predefined route, follow an edge, a pipe, a building, or the like, or to record a global or local map of the environment. Further, devices according to the present invention could be used for indoor or outdoor localization and positioning of drones, for stabilizing the height of a drone indoors where barometric pressure sensors are not accurate enough, or for the interaction of multiple drones such as concertized movements of several drones or recharging or refueling in the air or the like.

Further, the devices according to the present invention may be used within an interconnecting network of home appliances such as CHAIN (Cedec Home Appliances Interoperating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robot's performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as cat litter robots, security robots that detect intruders, robotic lawn mowers, automated pool cleaners, rain gutter cleaning robots, window washing robots, toy robots, telepresence robots, social robots providing company to less mobile people, or robots translating and speech to sign language or sign language to speech. In the context of less mobile people, such as elderly persons, household robots with the devices according to the present invention may be used for picking up objects, transporting objects, and interacting with the objects and the user in a safe way. Further the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas, or for manned or unmanned rescue operations in the air, in the sea, underground, or the like.

Further, the devices according to the present invention may be used in household, mobile or entertainment devices, such as a refrigerator, a microwave, a washing machine, a window blind or shutter, a household alarm, an air condition devices, a heating device, a television, an audio device, a smart watch, a mobile phone, a phone, a dishwasher, a stove or the like, to detect the presence of a person, to monitor the contents or function of the device, or to interact with the person and/or share information about the person with further household, mobile or entertainment devices. Herein, the devices according to the present invention may be used to support elderly or disabled persons, blind persons, or persons with limited vision abilities, such as in household chores or at work such as in devices for holding, carrying, or picking objects, or in a safety system with optical and/or acoustical signals adapted for signaling obstacles in the environment.

The devices according to the present invention may further be used in agriculture, for example to detect and sort out vermin, weeds, and/or infected crop plants, fully or in parts, wherein crop plants may be infected by fungus or insects. Further, for harvesting crops, the devices according to the present invention may be used to detect animals, such as deer, which may otherwise be harmed by harvesting devices. Further, the devices according to the present invention may be used to monitor the growth of plants in a field or greenhouse, in particular to adjust the amount of water or fertilizer or crop protection products for a given region in the field or greenhouse or even for a given plant. Further, in agricultural biotechnology, the devices according to the present invention may be used to monitor the size and shape of plants.

Further, the devices according to the present invention may be combined with sensors to detect chemicals or pollutants, electronic nose chips, microbe sensor chips to detect bacteria or viruses or the like, Geiger counters, tactile sensors, heat sensors, or the like. This may for example be used in constructing smart robots which are configured for handling dangerous or difficult tasks, such as in treating highly infectious patients, handling or removing highly dangerous substances, cleaning highly polluted areas, such as highly radioactive areas or chemical spills, or for pest control in agriculture.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. In this regard, determining a distance of an illuminated spot on a surface which may provide reflected or diffusely scattered light from the camera may be performed virtually independent of the distance of the light source from the illuminated spot. This property of the present invention is in direct contrast to known methods, such as triangulation or such as time-of-flight (TOF) methods, wherein the distance between the light source and the illuminated spot must be known a priori or calculated a posteriori in order to be able to determine the distance between the camera and the illuminated spot. In contrast hereto, for the camera according to the present invention is may be sufficient that the spot is adequately illuminated. Further, the devices according to the present invention may be used for scanning reflective surfaces, such of metal surfaces, independent whether they may comprise a solid or a liquid surface. Further, the devices according to the present invention may be used in inspections and maintenance, such as pipeline inspection gauges. Further, in a production environment, the devices according to the present invention may be used to work with objects of a badly defined shape such as naturally grown objects, such as sorting vegetables or other natural products by shape or size or cutting products such as meat or objects that are manufactured with a precision that is lower than the precision needed for a processing step.

Further, the devices according to the present invention may be used in local navigation systems to allow autonomously or partially autonomously moving vehicles or multicopters or the like through an indoor or outdoor space. A non-limiting example may comprise vehicles moving through an automated storage for picking up objects and placing them at a different location. Indoor navigation may further be used in shopping malls, retail stores, museums, airports, or train stations, to track the location of mobile goods, mobile devices, baggage, customers or employees, or to supply users with a location specific information, such as the current position on a map, or information on goods sold, or the like.

Further, the devices according to the present invention may be used to ensure safe driving of motorcycles, such as driving assistance for motorcycles by monitoring speed, inclination, upcoming obstacles, unevenness of the road, or curves or the like. Further, the devices according to the present invention may be used in trains or trams to avoid collisions.

Further, the devices according to the present invention may be used in handheld devices, such as for scanning packaging or parcels to optimize a logistics process. Further, the devices according to the present invention may be used in further handheld devices such as personal shopping devices, RFID-readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Further, the devices according to the present invention may be used in the context of gesture recognition. In this context, gesture recognition in combination with devices according to the present invention may, in particular, be used as a human-machine interface for transmitting information via motion of a body, of body parts or of objects to a machine. Herein, the information may, preferably, be transmitted via a motion of hands or hand parts, such as fingers, in particular, by pointing at objects, applying sign language, such as for deaf people, making signs for numbers, approval, disapproval, or the like, by waving the hand, such as when asking someone to approach, to leave, or to greet a person, to press an object, to take an object, or, in the field of sports or music, in a hand or finger exercise, such as a warm-up exercise. Further, the information may be transmitted by motion of arms or legs, such as rotating, kicking, grabbing, twisting, rotating, scrolling, browsing, pushing, bending, punching, shaking, arms, legs, both arms, or both legs, or a combination of arms and legs, such as for a purpose of sports or music, such as for entertainment, exercise, or training function of a machine. Further, the information may be transmitted by motion of the whole body or major parts thereof, such as jumping, rotating, or making complex signs, such as sign language used at airports or by traffic police in order to transmit information, such as "turn right", "turn left", "proceed", "slow down", "stop", or "stop engines", or by pretending to swim, to dive, to run, to shoot, or the like, or by making complex motions or body positions such as in yoga, pilates, judo, karate, dancing, or ballet. Further, the information may be transmitted by using a real or mock-up device for controlling a virtual device corresponding to the mock-up device, such as using a mock-up guitar for controlling a virtual guitar function in a computer program, using a real guitar for controlling a virtual guitar function in a computer program, using a real or a mock-up book for reading an e-book or moving pages or browsing through in a virtual document, using a real or mock-up pen for drawing in a computer program, or the like. Further, the transmission of the information may be coupled to a feedback to the user, such as a sound, a vibration, or a motion.

In the context of music and/or instruments, devices according to the present invention in combination with gesture recognition may be used for exercising purposes, control of instruments, recording of instruments, playing or recording of music via use of a mock-up instrument or by only pretending to have a instrument present such as playing air guitar, such as to avoid noise or make recordings, or, for conducting of a virtual orchestra, ensemble, band, big band, choir, or the like, for practicing, exercising, recording or entertainment purposes or the like.

Further, in the context of safety and surveillance, devices according to the present invention in combination with gesture recognition may be used to recognize motion profiles of persons, such as recognizing a person by the way of walking or moving the body, or to use hand signs or movements or signs or movements of body parts or the whole body as access or identification control such as a personal identification sign or a personal identification movement.

Further, in the context of smart home applications or internet of things, devices according to the present invention in combination with gesture recognition may be used for central or non-central control of household devices which may be part of an interconnecting network of home appliances and/or household devices, such as refrigerators, central heating, air condition, microwave ovens, ice cube makers, or water boilers, or entertainment devices, such as television sets, smart phones, game consoles, video recorders, DVD players, personal computers, laptops, tablets, or combinations thereof, or a combination of household devices and entertainment devices.

Further, in the context of virtual reality or of augmented reality, devices according to the present invention in combination with gesture recognition may be used to control movements or function of the virtual reality application or of the augmented reality application, such as playing or controlling a game using signs, gestures, body movements or body part movements or the like, moving through a virtual world, manipulating virtual objects, practicing, exercising or playing sports, arts, crafts, music or games using virtual objects such as a ball, chess figures, go stones, instruments, tools, brushes.

Further, in the context of medicine, devices according to the present invention in combination with gesture recognition may be used to support rehabilitation training, remote diagnostics, or to monitor or survey surgery or treatment, to overlay and display medical images with positions of medical devices, or to overlay display prerecorded medical images such as from magnetic resonance tomography or x-ray or the like with images from endoscopes or ultra sound or the like that are recorded during an surgery or treatment.

Further, in the context of manufacturing and process automation, devices according to the present invention in combination with gesture recognition may be used to control, teach, or program robots, drones, unmanned autonomous vehicles, service robots, movable objects, or the like, such as for programming, controlling, manufacturing, manipulating, repairing, or teaching purposes, or for remote manipulating of objects or areas, such as for safety reasons, or for maintenance purposes.

Further, in the context of business intelligence metrics, devices according to the present invention in combination with gesture recognition may be used for people counting, surveying customer movements, areas where customers spend time, objects, customers test, take, probe, or the like.

Further, devices according to the present invention may be used in the context of do-it-yourself or professional tools, especially electric or motor driven tools or power tools, such as drilling machines, saws, chisels, hammers, wrenches, staple guns, disc cutters, metals shears and nibblers, angle grinders, die grinders, drills, hammer drills, heat guns, wrenches, sanders, engraivers, nailers, jig saws, buiscuit joiners, wood routers, planers, polishers, tile cutters, washers, rollers, wall chasers, lathes, impact drivers, jointers, paint rollers, spray guns, morticers, or welders, in particular, to support precision in manufacturing, keeping a minimum or maximum distance, or for safety measures.

Further, the devices according to the present invention may be used to aid visually impaired persons. Further, devices according to the present invention may be used in touch screen such as to avoid direct context such as for hygienic reasons, which may be used in retail environments, in medical applications, in production environments, or the like. Further, devices according to the present invention may be used in agricultural production environments such as in stable cleaning robots, egg collecting machines, milking machines, harvesting machines, farm machinery, harvesters, forwarders, combine harvesters, tractors, cultivators, ploughs, destoners, harrows, strip tills, broadcast seeders, planters such as potato planters, manure spreaders, sprayers, sprinkler systems, swathers, balers, loaders, forklifts, mowers, or the like.

Further, devices according to the present invention may be used for selection and/or adaption of clothing, shoes, glasses, hats, prosthesis, dental braces, for persons or animals with limited communication skills or possibilities, such as children or impaired persons, or the like. Further, devices according to the present invention may be used in the context of warehouses, logistics, distribution, shipping, loading, unloading, smart manufacturing, industry 4.0, or the like. Further, in a manufacturing context, devices according to the present invention may be used in the context of processing, dispensing, bending, material handling, or the like.

The devices according to the present invention may be combined with one or more other types of measurement devices. Thus, the devices according to the present invention may be combined with one or more other types of sensors or detectors, such as a time of flight (TOF) detector, a stereo camera, a lightfield camera, a lidar, a radar, a sonar, an ultrasonic detector, or interferometry. When combining a camera according to the present invention with one or more other types of sensors or detectors, the camera according to the present invention and the at least one further sensor or detector may be designed as independent devices, with the camera according to the present invention being separate from the at least one further sensor or detector. Alternatively, the camera according to the present invention and the at least one further sensor or detector may fully or partially be integrated or designed as a single device.

Thus, as a non-limiting example, the devices according to the present invention may further comprise a stereo camera. As used herein, a stereo camera is a camera which is designed for capturing images of a scene or an object from at least two different perspectives. Thus, the devices according to the present invention may be combined with at least one stereo camera.

The stereo camera's functionality is generally known in the art, since stereo cameras generally are known to the skilled person. The combination with the devices according to the present invention may provide additional distance information. Thus, the devices according to the present invention may be adapted, in addition to the stereo camera's information, to provide at least one item of information on a longitudinal position of at least one object within a scene captured by the stereo camera. Information provided by the stereo camera, such as distance information obtained by evaluating triangulation measurements performed by using the stereo camera, may be calibrated and/or validated by using the devices according to the present invention. Thus, as an example, the stereo camera may be used to provide at least one first item of information on the longitudinal position of the at least one object, such as by using triangulation measurements, and the devices according to the present invention may be used to provide at least one second item of information on the longitudinal position of the at least one object. The first item of information and the second item of information may be used to improve accuracy of the measurements. Thus, the first item of information may be used for calibrating the second item of information or vice a versa. Consequently, the devices according to the present invention, as an example, may form a stereo camera system, having the stereo camera and the devices according to the present invention, wherein the stereo camera system is adapted to calibrate the information provided by the stereo camera by using the information provided by devices according to the present invention.

Consequently, additionally or alternatively, the devices according to the present invention may be adapted to use the second item of information, provided by the devices according to the present invention, for correcting the first item of information, provided by the stereo camera. Additionally or alternatively, the devices according to the present invention may be adapted to use the second item of information, provided by the devices according to the present invention, for correcting optical distortion of the stereo camera. Further, the devices according to the present invention may adapted to calculate stereo information provided by the stereo camera, and the second item of information provided by devices according to the present invention may be used for speeding up the calculation of the stereo information.

As an example, the devices according to the present invention may be adapted to use at least one virtual or real object within a scene captured by the devices according to the present invention for calibrating the stereo camera. As an example, one or more objects and/or areas and/or spots may be used for calibration. As an example, the distance of at least one object or spot may be determined by using the devices according to the present invention, and distance information provided by the stereo camera may be calibrated by using this distance is determined by using the devices according to the present invention. For instance, at least one active light spot of the devices according to the present invention may be used as a calibration point for the stereo camera. The active light spot, as an example, may move freely in the picture.

The devices according to the present invention may be adapted to continuously or discontinuously calibrate the stereo camera by using information provided by the active distance sensor. Thus, as an example, the calibration may take place at regular intervals, continuously or occasionally.

Further, typical stereo cameras exhibit measurement errors or uncertainties which are dependent on the distance of the object. This measurement error may be reduced when combined with information provided by the devices according to the present invention.

Combinations of stereo cameras with other types of distance sensors are generally known in the art. Thus, in D. Scaramuzza et al., IEEE/RSJ International Conference on Intelligent Robots and Systems, IROS 2007, pp. 4164-4169, 2007, an extrinsic self-calibration of a camera and a 3D laser range finder from natural scenes is disclosed. Similarly, in D. Klimentjew et al., IEEE Conference on Multisensor Fusion and Integration for Intelligent Systems (MFI), pages 236-241, 2010, a multi sensor fusion of camera and 3D laser range finder for object recognition is disclosed. As the skilled person will recognize, the laser range finder in these setups known in the art may simply be replaced or complemented by at least one device according to the present invention, without altering the methods and advantages disclosed by these prior art documents. For potential setups of the stereo camera, reference may be made to these prior art documents. Still, other setups and embodiments of the at least one optional stereo camera are feasible.

Further, the devices according to the present invention may be used for infra-red detection applications, heat-detection applications, thermometer applications, heat-seeking applications, flame-detection applications, fire-detection applications, smoke-detection applications, temperature sensing applications, spectroscopy applications, or the like. Further, devices according to the present invention may be used in photocopy or xerography applications. Further, devices according to the present invention may be used to monitor exhaust gas, to monitor combustion processes, to monitor industrial processes, to monitor chemical processes, to monitor food processing processes, or the like. Further, devices according to the present invention may be used for temperature control, motion control, exhaust control, gas sensing, gas analytics, motion sensing, chemical sensing, or the like.

Preferably, for further potential details of the camera, the method, the human-machine interface, the entertainment device, the tracking system, and the various uses of the camera, in particular with regard to the transfer device, the longitudinal optical sensors, the evaluation device and, if applicable, to the transversal optical sensor, the modulation device, the illumination source and the imaging device, specifically with respect to the potential materials, setups, uses, and further details, reference may be made to one or more of WO 2012/110924 A1, US 2012/206336 A1, WO 2014/097181 A1, and US 2014/291480 A1, the full content of all of which is herewith included by reference.

The above-described camera, the method and the proposed uses of the camera have considerable advantages over the prior art. Thus, generally, a simple and, still, efficient camera for an accurate recording of at least one image of at least one object in space may be provided.

Therein, as an example, a three-dimensional image of the object or a part thereof may be recorded in a fast and efficient way without ambiguity.

As compared to devices known in the art, the camera as proposed provides a high degree of simplicity, specifically with regard to an optical setup of the camera. Thus, in principle, the converging element, the first aperture element having the first adjustable aperture area, the second aperture element having the second adjustable area, and the optical sensor being adapted to generate the first picture when the first aperture area exceeds the second aperture area and to generate the second picture when the second aperture area exceeds the first aperture area in conjunction with an appropriate evaluation device adapted for generating the image of the object by comparing the first picture and the second picture is sufficient for accurately recording the image of the object in space. This setup is specifically suited for camera applications. Thus, cost-efficient cameras and tracking devices may be provided which may be used for a large number of imaging and tracking purposes.

Summarizing, in the context of the present invention, the following embodiments are regarded as particularly preferred:

Embodiment 1: A camera for an optical detection of at least one object, comprising:
  at least one converging element, wherein the converging element is adapted to converge a light beam passing through the converging element to travel along a beam path to be received by at least one optical sensor;

at least one first aperture element having a first adjustable area, wherein the first aperture element is located in the beam path between the converging element and the optical sensor;

at least one second aperture element having a second adjustable area, wherein the second aperture element is located in the beam path between the first aperture element and the optical sensor;

the at least one optical sensor being adapted for receiving the light beam, wherein the optical sensor is further adapted to generate at least one first picture in a first setting comprising the first aperture area exceeding the second aperture area and to generate at least one second picture in a second setting comprising the second aperture area exceeding the first aperture area; and at least one evaluation device designed to generate at least one image of the at least one object by comparing the at least one first picture and the at least one second picture.

Embodiment 2: The camera according to the preceding embodiment, wherein the converging element comprises a converging lens.

Embodiment 3: The camera according to any one of the preceding embodiments, wherein the converging element comprises a compound lens.

Embodiment 4: The camera according to the preceding embodiment, wherein the compound lens is adapted to function together with the second aperture device as a telecentric lens.

Embodiment 5: The camera according to the preceding embodiment, wherein the telecentric lens comprises an entrance pupil at infinity.

Embodiment 6: The camera according to the preceding embodiment, wherein the first aperture element comprises an adjustable aperture stop.

Embodiment 7: The camera according to any one of the preceding embodiments, wherein the first aperture element is located in a focal plane within an image space of the converging element.

Embodiment 8: The camera according to the preceding embodiment, wherein the telecentric lens is obtained by placing the first aperture element at one of the focal points of the lens.

Embodiment 9: The camera according to the preceding embodiment, wherein the telecentric lens is obtained by placing the aperture stop at the focal point of the lens which is located behind the lens as defined from an incident light beam which impinges onto the lens.

Embodiment 10: The camera according to embodiment 3, wherein the compound lens is adapted to function together with the second aperture device as a hypercentric lens.

Embodiment 11: The camera according to any one of the preceding embodiments, wherein the first aperture element is located off a focal plane within an image space of the converging element.

Embodiment 12: The camera according to the preceding embodiment, wherein the second aperture element comprises an adjustable aperture stop.

Embodiment 13: The camera according to any one of the preceding embodiments, wherein the second aperture element is adjustable in a manner perpendicular to the optical axis.

Embodiment 14: The camera according to any one of the preceding embodiments, wherein the second aperture element comprises at least one spatial light modulator being adapted to modify at least one property of the light beam in a spatially resolved fashion.

Embodiment 15: The camera according to the preceding embodiment, wherein the spatial light modulator has a matrix of pixels, wherein each pixel is controllable to individually modify the at least one optical property of a portion of the light beam passing the pixel before the light beam reaches the at least one optical sensor.

Embodiment 16: The camera according to any one of the two preceding embodiments, wherein the camera further comprises at least one modulator device adapted for periodically controlling at least two of the pixels with different modulation frequencies.

Embodiment 17: The camera according to any one of the three preceding embodiments, wherein each of the pixels of the spatial light modulator is individually controllable in a manner that the adjustable area of the second aperture element is adjustable.

Embodiment 18: The camera according to any one of the four preceding embodiments, wherein each of the pixels of the spatial light modulator is individually controllable in a manner that the location of the aperture element perpendicular to the optical axis is adjustable.

Embodiment 19: The camera according to any one of the five preceding embodiments, wherein each of the pixels of the spatial light modulator comprises a micro-lens, wherein the micro-lenses are tunable lenses.

Embodiment 20: The camera according to any one of the five preceding embodiments, wherein each of the pixels of the spatial light modulator comprises a micro-mirror, wherein the micro-mirrors are tunable mirrors.

Embodiment 21: The camera according to any one of the preceding embodiments, wherein the optical sensor comprises at least one imaging device.

Embodiment 22: The camera according to the preceding embodiment, wherein the imaging device is located in a position furthest away from the object.

Embodiment 23: The camera according to any of the two preceding embodiments, wherein the light beam passes through the at least one longitudinal optical sensor before illuminating the imaging device.

Embodiment 24: The camera according to the three preceding embodiments, wherein the inorganic imaging device comprises a pixelated inorganic chip, a pixelated organic detector; a CCD chip, preferably a multi-color CCD chip or a full-color CCD chip; a CMOS chip; an IR chip; an RGB chip.

Embodiment 25: The camera according to any one of the preceding embodiments, wherein the optical sensor comprises at least one longitudinal optical sensor, wherein the longitudinal optical sensor has at least one sensor region, wherein the longitudinal optical sensor is designed to generate at least one longitudinal sensor signal in a manner dependent on an illumination of the sensor region by the light beam, wherein the longitudinal sensor signal, given the same total power of the illumination, is dependent on a beam cross-section of the light beam in the sensor region.

Embodiment 26: The camera according to the preceding embodiment, wherein the evaluation device is further designed to generate at last one item of information on a longitudinal position of the object by evaluating the longitudinal sensor signal.

Embodiment 27: The camera according to any of the preceding embodiments, wherein the at least one longitudinal optical sensor is a transparent optical sensor.

Embodiment 28: The camera according to any of the preceding embodiments, wherein the sensor region of the longitudinal optical sensor is exactly one continuous sensor region, wherein the longitudinal sensor signal is a uniform sensor signal for the entire sensor region.

Embodiment 29: The camera according to any of the preceding embodiments, wherein the sensor region of the longitudinal optical sensor is or comprises a sensor area, the sensor area being formed by a surface of the respective device, wherein the surface faces towards the object or faces away from the object.

Embodiment 30: The camera according to any of the preceding embodiments, wherein the camera is adapted to generate the longitudinal sensor signal by one or more of measuring an electrical resistance or a conductivity of at least one part of the sensor region.

Embodiment 31: The camera according to the preceding embodiment, wherein the camera is adapted to generate the longitudinal sensor signal by performing at least one current-voltage measurement and/or at least one voltage-current-measurement.

Embodiment 32: The camera according to any of the preceding embodiments, wherein the evaluation device is designed to generate the at least one item of information on the longitudinal position of the object from at least one predefined relationship between the geometry of the illumination and a relative positioning of the object with respect to the camera, preferably taking account of a known power of the illumination and optionally taking account of a modulation frequency with which the illumination is modulated.

Embodiment 33: The camera according to any of the preceding embodiments, wherein the camera furthermore has at least one modulation device for modulating the illumination.

Embodiment 34: The camera according to the preceding embodiment, wherein the light beam is a modulated light beam.

Embodiment 35: The camera according to the preceding embodiment, wherein the camera is designed to detect at least two longitudinal sensor signals in the case of different modulations, in particular at least two sensor signals at respectively different modulation frequencies, wherein the evaluation device is designed to generate the at least one item of information on the longitudinal position of the object by evaluating the at least two longitudinal sensor signals.

Embodiment 36: The camera according to any of the preceding embodiments, wherein the longitudinal optical sensor is furthermore designed in such a way that the longitudinal sensor signal, given the same total power of the illumination, is dependent on a modulation frequency of a modulation of the illumination.

Embodiment 37: The camera according to any one of the preceding embodiments, wherein the evaluation device is adapted to combine first information comprised within the at least one first picture and second information comprised within the at least one second picture in order to generate the at least one three-dimensional image of the at least one object.

Embodiment 38: The camera according to any of the preceding embodiments, wherein the camera has at least two longitudinal optical sensors, wherein the longitudinal optical sensors are stacked.

Embodiment 39: The camera according to the preceding embodiment, wherein the longitudinal optical sensors are stacked along the optical axis.

Embodiment 40: The camera according to any of the two preceding embodiments, wherein the longitudinal optical sensors form a longitudinal optical sensor stack, wherein the sensor regions of the longitudinal optical sensors are oriented perpendicular to the optical axis.

Embodiment 41: The camera according to any of the three preceding embodiments, wherein the longitudinal optical sensors are arranged such that a light beam from the object illuminates all longitudinal optical sensors, preferably sequentially, wherein at least one longitudinal sensor signal is generated by each longitudinal optical sensor.

Embodiment 42: The camera according to any of the preceding embodiments, wherein the evaluation device is adapted to normalize the longitudinal sensor signals and to generate the information on the longitudinal position of the object independent from an intensity of the light beam.

Embodiment 43: The camera according to the preceding embodiment, wherein the evaluation device is adapted to recognize whether the light beam widens or narrows, by comparing the longitudinal sensor signals of different longitudinal sensors.

Embodiment 44: The camera according to any of the preceding embodiments, wherein the evaluation device is adapted to generate the at least one item of information on the longitudinal position of the object by determining a diameter of the light beam from the at least one longitudinal sensor signal.

Embodiment 45: The camera according to the preceding embodiment, wherein the evaluation device is adapted to compare the diameter of the light beam with known beam properties of the light beam in order to determine the at least one item of information on the longitudinal position of the object, preferably from a known dependency of a beam diameter of the light beam on at least one propagation coordinate in a direction of propagation of the light beam and/or from a known Gaussian profile of the light beam.

Embodiment 46: The camera according to any one of the preceding embodiments, furthermore comprising at least one housing having at least one opening, wherein the converging element is located at the opening, and wherein at least the first aperture element, the second aperture element and the optical sensor are located inside the housing.

Embodiment 47: The camera according to the preceding embodiment, wherein the evaluation device is located at least partially outside the housing of the camera.

Embodiment 48: The camera according to any one of the preceding embodiments, furthermore comprising at least one illumination source.

Embodiment 49: The camera according to the preceding embodiment, wherein the illumination source is selected from: an illumination source, which is at least partly connected to the object and/or is at least partly identical to the object; an illumination source which is designed to at least partly illuminate the object with a primary radiation.

Embodiment 50: The camera according to the preceding embodiment, wherein the light beam is generated by a reflection of the primary radiation on the object and/or by light emission by the object itself, stimulated by the primary radiation.

Embodiment 51: The camera according to the preceding embodiment, wherein the spectral sensitivities of the longitudinal optical sensor is covered by the spectral range of the illumination source.

Embodiment 52: The camera according to the preceding embodiment, wherein the illumination device is located at least partially outside the housing.

Embodiment 53: The camera according to any one of the preceding embodiments, further comprising at least one transversal optical sensor, the transversal optical sensor being adapted to determine a transversal position of the light beam traveling from the object to the camera, the transversal position being a position in at least one dimension perpendicular to an optical axis of the camera, the transversal optical sensor being adapted to generate at least one transversal sensor signal, wherein the evaluation device is further designed to generate at least one item of information on a transversal position of the object by evaluating the transversal sensor signal.

Embodiment 54: The camera according to the preceding embodiment, wherein the transversal optical sensor is a photo detector having at least one first electrode, at least one second electrode and at least one photoconductive material embedded in between two separate layers of a transparent conductive oxide, wherein the transversal optical sensor has a sensor area, wherein the first electrode and the second electrode are applied to different locations of one of the layers of the transparent conductive oxide, wherein the at least one transversal sensor signal indicates a position of the light beam in the sensor area.

Embodiment 55: The camera according to any of the two preceding embodiments, wherein the at least one transversal optical sensor comprises at least one transparent transversal optical sensor.

Embodiment 56: The camera according to any of the three preceding embodiments, wherein the sensor area of the transversal optical sensor is formed by a surface of the transversal optical sensor, wherein the surface faces towards the object or faces away from the object.

Embodiment 57: The camera according to any of the four preceding embodiments, wherein the first electrode and/or the second electrode are a split electrode comprising at least two partial electrodes.

Embodiment 58: The camera according to the preceding embodiments, wherein at least four partial electrodes are provided.

Embodiment 59: The camera according to any one of the two preceding embodiments, wherein electrical currents through the partial electrodes are dependent on a position of the light beam in the sensor area.

Embodiment 60: The camera according to the preceding embodiment, wherein the transversal optical sensor is adapted to generate the transversal sensor signal in accordance with the electrical currents through the partial electrodes.

Embodiment 61: The camera according to any of the two preceding embodiments, wherein the optical sensor, preferably the transversal optical sensor and/or the evaluation device, is adapted to derive the information on the transversal position of the object from at least one ratio of the currents through the partial electrodes.

Embodiment 62: The camera according to any of the nine preceding embodiments, wherein the at least one transversal optical sensor is a transparent optical sensor.

Embodiment 63: The camera according to any of the ten preceding embodiments, wherein the transversal optical sensor and the longitudinal optical sensor are stacked along the optical axis such that a light beam travelling along the optical axis both impinges the transversal optical sensor and the at least two longitudinal optical sensors.

Embodiment 64: The camera according to the preceding embodiment, wherein the light beam subsequently passes through the transversal optical sensor and the at least two longitudinal optical sensors or vice versa.

Embodiment 65: The camera according to the preceding embodiment, wherein the light beam passes through the transversal optical sensor before impinging on one of the longitudinal optical sensors.

Embodiment 66: The camera according to any of the twelve preceding embodiments, wherein the transversal sensor signal is selected from the group consisting of a current and a voltage or any signal derived thereof.

Embodiment 67: The camera according to any one of the thirteen preceding embodiments, wherein the transversal optical sensor is located inside the housing of the camera.

Embodiment 68: A tracking system for tracking the position of at least one movable object, the tracking system comprising at least one camera according to any of the preceding embodiments, the tracking system further comprising at least one track controller, wherein the track controller is adapted to track a series of positions of the object, each comprising at least one item of information on a position of the object at a specific point in time.

Embodiment 69: The tracking system according to the preceding embodiment, wherein the tracking system further comprises at least one beacon device connectable to the object, wherein the tracking system is adapted such that the optical sensor may generate an information on the position of the at least one beacon device.

Embodiment 70: A method for recording at least one image of at least one object, in particular by using a camera according to any of the preceding embodiments relating to a camera, the method comprising the following steps:

generating at least one first picture in a first setting of the camera comprising a first aperture area of at least one first aperture element exceeding a second aperture area of at least one second aperture element and generating at least one second picture in a second setting of the camera comprising the second aperture area exceeding the first aperture area by using at least one optical sensor being adapted for receiving the light beam, wherein the light beam is converged by passing through a converging element to travel on a beam path to the at least one optical sensor, wherein the first aperture element is located in the beam path between the converging element and the optical sensor, and wherein the second aperture element is located in the beam path between the first aperture element and the optical sensor; and generating at least one image of at least one object by comparing the at least one first picture and the at least one second picture.

Embodiment 71: The method according to the preceding embodiment, wherein the first aperture element is located in a focal plane within an image space of the converging element.

Embodiment 72: The method according to any one of the two preceding embodiments, wherein the first aperture element comprises an adjustable aperture stop, wherein the aperture area of the aperture stop is adjusted.

Embodiment 73: The method according to any one of the three preceding embodiments, wherein the second aperture element comprises an adjustable aperture stop, wherein the aperture area of the aperture stop is adjusted.

Embodiment 74: The method according to any of the four preceding embodiments, wherein the second aperture element is adjusted perpendicular to the optical axis of the camera.

Embodiment 75: The method according to any of the four preceding embodiments, wherein the second aperture element comprises at least one spatial light modulator being adapted to modify at least one property of the light beam in a spatially resolved fashion, wherein the spatial light modulator has a matrix of pixels.

Embodiment 76: The method according to the preceding embodiment, wherein each pixel is individually controlled to modify the at least one optical property of a portion of the light beam passing the pixel before the light beam reaches the at least one optical sensor in a manner that the adjustable area of the aperture element is adjusted.

Embodiment 77: The method according to any one of the two preceding embodiments, wherein each pixel is individually controlled to modify the at least one optical property of a portion of the light beam passing the pixel before the light beam reaches the at least one optical sensor in a manner that the location of the aperture element perpendicular to the optical axis of the camera is adjusted.

Embodiment 78: The method according to any one of the eight preceding embodiments, wherein at least two second pictures are generated, wherein the location of the second aperture element perpendicular to the optical axis of the camera is adjusted between generating the at least two second pictures.

Embodiment 79: The use of a camera according to any of the preceding embodiments relating to a camera for a purpose of use, selected from the group consisting of: an imaging application, a camera application, a metrology application for machine vision or in optical lithography, a quality management application, a surveillance application, a safety application, a manufacturing application, an automotive application, an autonomous driving application, a navigation application, an localization application, an entertainment application, a household application.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

EXEMPLARY EMBODIMENTS

Figure 1:
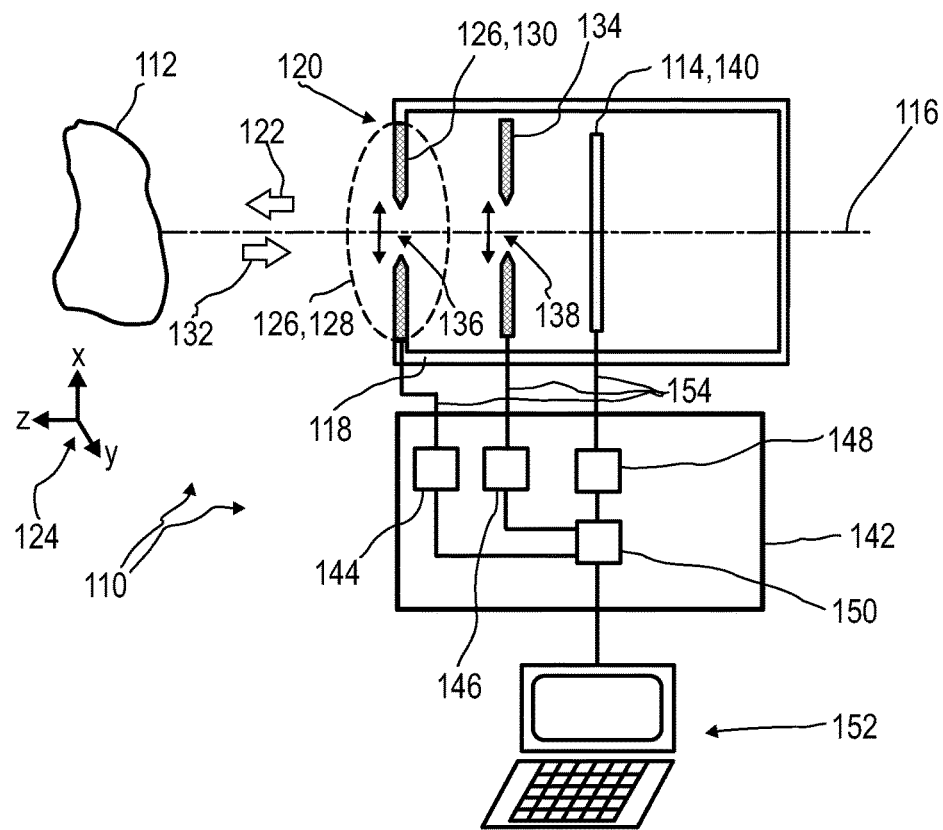
FIG. 1 illustrates an exemplary embodiment of a camera according to the present invention.

FIG. 1 illustrates, in a highly schematic illustration, an exemplary embodiment of a camera 110 according to the present invention, for an optical recording of at least one image of at least one object 112. The camera 110 comprises at least one optical sensor 114, which, in this particular embodiment, is arranged along an optical axis 116 of the camera 110. Specifically, the optical axis 116 may be an axis of symmetry and/or rotation of the setup of the optical sensors 114. Preferably, the optical sensors 114 may be located inside a housing 118 of the camera 110. An opening 120 in the housing 118, which may, particularly, be located concentrically with regard to the optical axis 116, preferably defines a direction of view 122 of the camera 110. A coordinate system 124 may be defined, in which a direction parallel or antiparallel to the optical axis 116 is defined as a longitudinal direction, whereas directions perpendicular to the optical axis 116 may be defined as transversal directions. In the coordinate system 124, symbolically depicted in FIG. 1, a longitudinal direction is denoted by z and transversal directions are denoted by x and y, respectively. However, other types of coordinate systems 124 are feasible.

Figure 2:
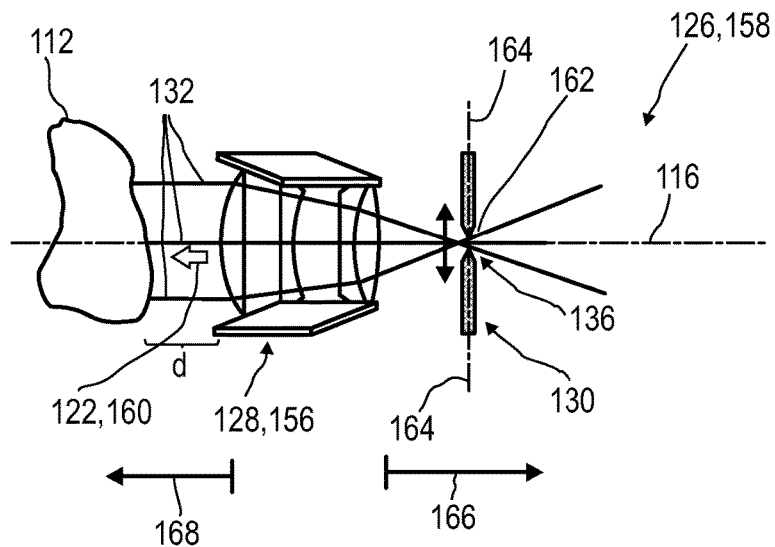
FIG. 2 presents a preferred embodiment for a transfer device to be employed in the camera according to the present invention.

Further, at least one transfer device 120 is, preferably, located at the opening 120 of the housing 118 of the camera 110. According to the present invention, the transfer device 126 comprises at least one converging element 128 and at least one first aperture element 130. Herein, the converging element 128 is adapted to converge a light beam 132 which passes through the converging element 128 to travel on a beam path along an optical axis 116 of the camera 110 to be received by the optical sensor 114. Therefore, the converging element 128 may exhibit converging properties to the incident light beam 132. Preferably, an optical lens, in particular one or more refractive lenses, particularly converging thin refractive lenses, such as convex or biconvex thin lenses, and/or one or more convex mirrors, and/or a compound lens, such as schematically depicted in FIG. 2, may be used for this purpose. Further details of a preferred type of the compound lens are shown in FIG. 2.

Thus, the light beam 132 which emerges from the object 112 may, first, travel on a beam path along the optical axis 116 of the camera 110 through the transfer device 126, which comprises the converging element 128 and the first aperture element 130, and, thereafter, through a second aperture element 134 which is located in the beam path between the first aperture element 130 and the optical sensor 114 until it may, finally, impinge on the optical sensor 114. Both the first aperture element 130 and the second aperture element 134 are adapted to only allow a portion of the incident light beam 132 to pass through while the other portions of the incident light beam 132 are stopped and/or reflected. According to the present invention, the first aperture element 130 comprises a first adjustable area 136 while the second aperture element 134 comprise a second adjustable area 138, which are symbolically denoted in FIG. 1 by adjacent arrows perpendicular to the optical axis 116.

Figure 3:
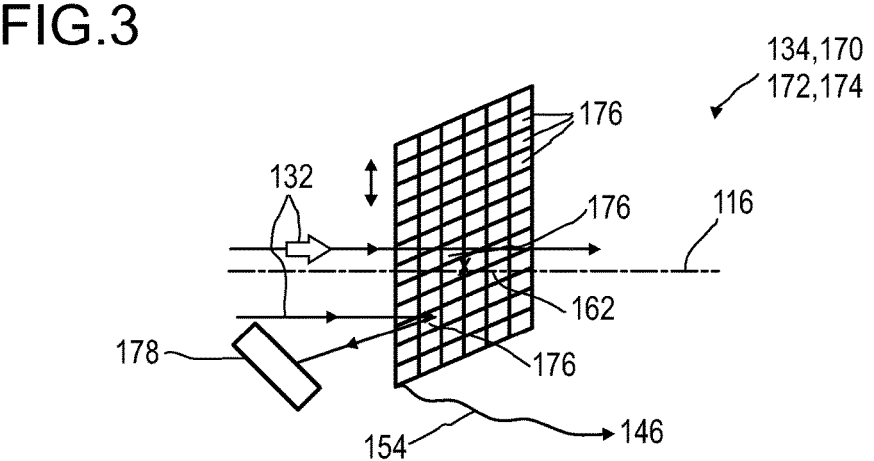
FIG. 3 depicts an alternative embodiment for an aperture element to be employed in the camera according to the present invention.

Thus, as shown in the embodiment of FIG. 1, both the first aperture element 130 and the second aperture element 134 may have an adjustable area which may correspond to an adjustable degree of opening of the aperture. Herein, the openings of both the first aperture element 130 and the second aperture element 134 may be located at a center of the respective aperture element 130, 134 in a manner that the center of the respective aperture element 130, 134 may coincide with the optical axis 116 of the camera 110. However, other arrangements may be possible. Further, in an alternative embodiment, such as shown in FIG. 3, the first aperture element 130 and/or the second aperture element 134 may comprise a pixelated optical element which may, also, be adapted for allowing only a portion of the incident light beam 132 to pass through while the other portions of the incident light beam are stopped and/or reflected. Further details of the pixelated optical element are presented in FIG. 3.

As already mentioned above, the camera 110 according to the present invention comprises the at least one optical sensor 114, which is capable of acquiring the at least one optical image of the object 112. In the embodiment as depicted in FIG. 1, the optical sensor 114 comprises at least one imaging device 140 which is adapted to generate a one-, two-, or three-dimensional image of the object 112 or of a part thereof. In particular, the imaging device 140 may be or comprise a device selected from the group consisting of: a pixelated organic camera element, preferably a pixelated organic camera chip; a pixelated inorganic camera element, preferably a pixelated inorganic camera chip, more preferably a CCD-chip or CMOS-chip; a monochrome camera element, preferably a monochrome camera chip; a multicolor camera element, preferably a multicolor camera chip; a full-color camera element, preferably a full-color camera chip. Thus, the imaging device 140 may be or may comprise at least one device selected from the group consisting of a monochrome imaging device, a multi-chrome imaging device and at least one full color imaging device.

Other embodiments of the imaging device 140 (not depicted here) are also possible, in particular an embodiment in which the optical sensor 114 may comprise at least one spatial light modulator (SLM). Herein, the SLM may comprise a matrix of pixels, wherein each of the pixels may individually be addressable. In a further, particularly preferred embodiment, the optical sensor 114 may comprise at least one longitudinal optical sensor having at least one sensor region, wherein the longitudinal optical sensor is designed to generate at least one longitudinal sensor signal in a manner dependent on an illumination of the sensor region by the light beam 132, wherein the longitudinal sensor signal, given the same total power of the illumination, is dependent, according to the so-called "FiP effect" on a beam cross-section of the light beam 132 in the sensor region. Further, given the same total power of the illumination, the longitudinal sensor signal may be dependent on the modulation frequency of the modulation of the illumination. Further, in order to being capable of acquiring a complete image of the object 112, additionally, at least one transversal optical sensor may be employed, wherein the transversal optical sensor is adapted to determine a transversal position of the at least one light beam 132 traveling from the object 112 to the camera 110. For potential embodiments of the longitudinal optical sensor and the transversal optical sensor, reference may be made to WO 2012/110924 A1 and 2014/097181 A1, respectively.

In accordance with the present invention, the optical sensor 114 is further adapted to generate at least one first picture in a first setting of the camera 110 and to generate at least one second picture in a second setting of the camera 110. Herein, in the first setting of the camera 110, which may also be denominated as a "front mode", the first aperture element 130 and the second aperture element 134 are adjusted in a manner that the first aperture area 136 exceeds the second aperture area 138. Similarly, in the second setting of the camera 110, which may also be denoted as a "normal mode", the first aperture element 130 and the second aperture element 138 are adjusted in a manner that the second aperture area 138 exceeds the first aperture area 136.

Thus, in the front mode the converging element 128 behaves as a telecentric lens which comprises an entrance pupil at infinity, such that an orthographic projection of the object 112 can be generated. As will be shown in more detail in FIG. 2, oblique rays which might pass through the center of the first aperture 130 being located at the optical axis 116 are, thus, parallel to the optical axis 116 in front of the converging element 128. Consequently, the magnification of the converging element 128 having the entrance pupil at infinity turns out to be independent of the distance between the object 112 and the converging element 128. On the other hand, in the normal mode the converging element 128 may not be considered as a lens system which behaves as the telecentric lens. Accordingly, the magnification of the converging element 128 depends, as normally, on the distance between the object 112 and the converging element 128.

Thus, by recording the first picture of the object 112 in the first setting in the front mode, by recording the second picture of the object 112 in the second setting in the normal mode, and by comparing the first picture and the second picture, the image of the object 112 is obtained. For this purpose, a comparison of first sizes of the object 112 within the first picture with second sizes of the object 112 within the second picture may be performed. Therefrom, at least one item of information on the longitudinal position of the object 112 may, thus, be determined.

The evaluation device 142 is, generally, designed to generate at least one item of information on a position of the object 112 by evaluating the sensor signal of the optical sensor 114. For this purpose, the evaluation device 142 may comprise one or more electronic devices and/or one or more software components, in order to provide the first setting and the second setting of the camera 110, to record the first picture and the second picture of the object 112 in the respective modes, and to compare the first picture and the second picture, which are symbolically denoted by a first aperture adjuster 144, a second aperture adjuster 146, a picture recording unit 148, and a comparison device 150. As already explained, the evaluation device 142 is, thus, adapted to determine the at least one item of information on the longitudinal position of the object 112 by comparing at least two pictures as recorded by the optical sensor 114 within the mentioned two different settings of the camera 110.

Generally, the evaluation device 142 may be part of a data processing device 152 and/or may comprise one or more data processing devices 152. The evaluation device may be fully or partially integrated into the housing 118 and/or may fully or partially be embodied as a separate device which is electrically connected in a wireless or wire-bound fashion, such as by signal leads 154, to the longitudinal optical sensor 114. The evaluation device may further comprise one or more additional components, such as one or more electronic hardware components and/or one or more software components, such as one or more measurement units and/or one or more evaluation units and/or one or more controlling units (not depicted in FIG. 1). The evaluation device 142 may, further, be adapted to perform at least one computer program, such as at least one computer program performing or supporting the step of generating the items of information. As an example, one or more algorithms may be implemented which, by using the sensor signals as input variables, may perform a comparison between the first picture and the second picture.

The light beam 132 for illuming the sensor region 130 of the optical sensor 114 may be generated by a light-emitting object 112. Alternatively or in addition, the light beam 132 may be generated by a separate illumination source (not depicted here), which may include an ambient light source and/or an artificial light source, such as a light-emitting diode, being adapted to illuminate the object 112 that the object 112 may be able to reflect at least a part of the light generated by the illumination source in a manner that the light beam 132 may be configured to reach the sensor region of the optical sensor 114, preferably by entering the housing 118 of the camera 110 through the opening 124 along the optical axis 116.

In a specific embodiment, the illumination source may be a modulated light source, wherein one or more modulation properties of the illumination source may be controlled by at least one modulation device. Alternatively or in addition, the modulation may be effected in a beam path between the illumination source and the object 112 and/or between the object 112 and the longitudinal optical sensor 114. Further possibilities may be conceivable. In this specific embodiment, it may be advantageous taking into account one or more of the modulation properties, in particular the modulation frequency, when evaluating the sensor signal of the transversal optical sensor 114 for determining the at least one item of information on the position of the object 112.

The camera 110 may have a straight beam path or a tilted beam path, an angulated beam path, a branched beam path, a deflected or split beam path or other types of beam paths. Further, the light beam 132 may propagate along each beam path or partial beam path once or repeatedly, unidirectionally or bidirectionally. Thereby, the components listed above or the optional further components listed in further detail below may fully or partially be located in front of the optical sensors 114 and/or behind the optical sensors 114.

FIG. 2 schematically depicts a preferred embodiment for the transfer device 126 which may be employed in the camera 110 according to the present invention. As mentioned above, the transfer device 126 comprises the at least one converging element 128 and the first aperture element 130. In this preferred embodiment, the converging element 128 comprises a compound lens 156 which is adapted to function together with the first aperture element 130 as a telecentric lens 158. The compound lens 156 as presented in FIG. 2 can be considered as a common example for an objective to be employed within the telecentric lens 158. However, other kinds of objectives which are suitable for the mentioned purpose may also be applicable.

Herein, the converging element 128 comprises an entrance pupil 160 in the direction of view 122 at infinity. As can be derived from FIG. 2, the light beam 132 which comprises oblique rays being parallel to the optical axis 116 in front of the converging element 128, first, passes through the converging element 128, by which the light beam 132 is converged in a manner that the rays, subsequently, pass through the center 162 of the first aperture element 130 which is located at the optical axis 116. According to the present invention, the first aperture element 130 may be located in a focal plane 164 within an image space 166 of the converging element 128. Herein, the space behind the converging element 128 being directed along the direction of the impinging light beam 132 is, usually, denominated as the image space 166 while the space in front of the lens system being directed towards the impinging light beam 132 is, generally, denoted as object space 168.

Herein, the magnification of the compound lens 156 functions as the telecentric lens 158 having the entrance pupil 160 at infinity is independent of the distance d between the object 112 and the front of the compound lens 156. As a result, the orthographic projection of the object 112 can be generated. For this purpose, the first aperture area 136 in the first aperture element 130 exhibits a small value which is, in particular, smaller than the second aperture area 138 of the second aperture element 134 as depicted in FIG. 1. As a result, the camera 110 acquires here the first setting during which the first picture is recorded. However, for recording the second picture, the second setting has to be employed. This may be achieved here, in particular, by increasing the first aperture area 136 of the first aperture element 130 in a manner that it exceeds the second aperture area 138 of the second aperture element 134. In the second setting, the transfer device 126 can, however, no longer be considered to function as the telecentric lens 158 but rather acquires the normal mode as described above.

In an alternative embodiment (not depicted here), the first aperture element 130 may not be located in a focal plane 164 within an image space 166 of the converging element 128 but off the focal plane 164. In this embodiment, the compound lens may function as a hypercentric lens or a pericentric lens as described above in more detail.

FIG. 3 schematically depicts an alternative embodiment for an aperture element which may be employed in the camera 110 according to the present invention. In particular, as exemplary shown in FIG. 3, the second aperture element 134 may be or comprise a pixelated optical element 170 which may be adapted for allowing only a portion of the incident light beam to pass through while the other portions of the incident light beam are stopped and/or reflected. In particular, the pixelated optical element 170 may comprise at least one spatial light modulator 172. Herein, the spatial light modulator 172 may be adapted to modify at least one property of the incident light beam 132 in a spatially resolved fashion, in particular to locally modify a transmissibility and/or reflectivity of the incident light beam 132. For this purpose, the spatial light modulator 172 may comprise a matrix 174 of pixels 176, wherein each of the pixels 176 may individually be addressable, such as by the second aperture adjuster 146, which may be connected to the spatial light modulator 172 by one of the signal leads 154, in order to allow a portion of the light beam passing through the respective pixel 176 or not. Accordingly, the portion of the light beam 132 which may not pass through the respective pixel 176 may be absorbed by the pixel 176 and/or reflected, such as by a target 178 which may especially be provided for this purpose.

In an especially preferred embodiment, each of the pixels 176 of the spatial light modulator 172 may, for this purpose comprise, a digital micro-mirror device (not depicted here). Herein, the digital micro-mirror device may comprise an array of micro-mirrors, wherein each of the micro-mirrors may, preferably, be a tunable mirror. This kind of spatially modulating an incident light beam may also be denominated as "Digital Light Processing®" or "DLP". Alternatively or in addition, each of the pixels 176 of the spatial light modulator 172 may, for this purpose comprise, a micro-lens, wherein each of the micro-lenses may, preferably, be a tunable lens. Further, the camera 110 can also comprise at least one modulator device (not depicted here) which may be adapted to periodically controlling at least two of the pixels 176 of the spatial light modulator 172 with different modulation frequencies.

Further, since each of the pixels 176 of the spatial light modulator 172 may be controllable individually, the second adjustable area 138 of the second aperture element 134 may be adjustable between different states which are distinguished from each other by their transmissibility and/or reflectivity. Adjusting the second adjustable area 138 may, preferably, be achieved by tuning the pixels 176 which are located around the center 162 of the spatial light modulator 172 along the optical axis 116 into a first state comprising a high transmissibility while the other pixels 176 may be tuned into a second state comprising a high reflectivity. In this manner, the pixels 176 of the spatial light modulator 172 may be tuned into a fashion in which the spatial light modulator 172 can be considered as the second aperture element 134 which comprises the second adjustable area 138.

Alternatively or in addition, a location of the second aperture element 134, in particular the location of the second aperture element 134 being perpendicular to the optical axis 116 of the camera 110, may further be adjustable. By adjusting the location of the second aperture element 134 with respect to the optical axis 116 of the camera 110, also objects which are not directly in front of the converging element 128 may also be observable, which constitutes a remarkable difference between the known telecentric lenses and this embodiment.

Figure 4:
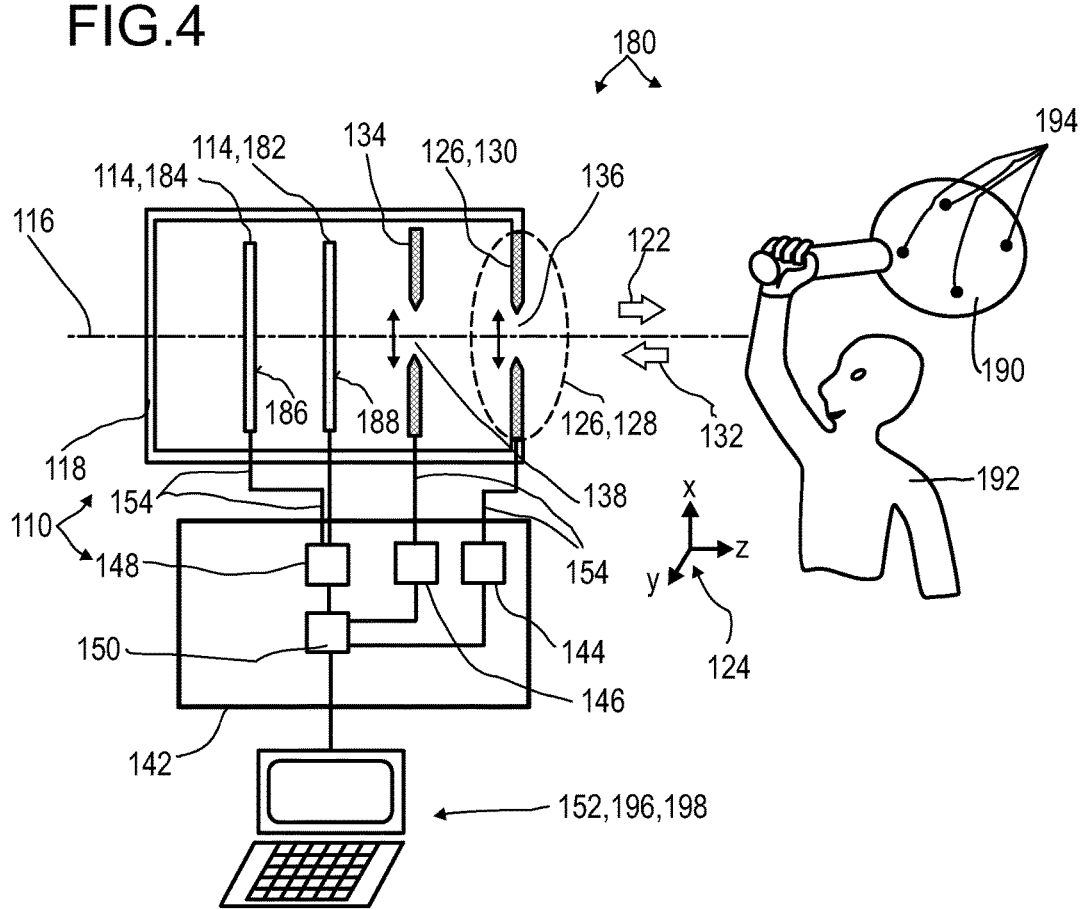
FIG. 4 shows an exemplary embodiment of the camera and of a tracking system comprising the camera according to the present invention.

As an example, FIG. 4 shows an exemplary embodiment of a tracking system 180 adapted for tracking a position of at least one object 112, which comprises the camera 110. With regard to the camera 110, reference may be made to the full disclosure of this application. Basically, all potential embodiments of the camera 110 may also be embodied in the embodiment shown in FIG. 4. The evaluation device 142 may be connected to the at least one optical sensor 114, in particular, by the signal leads 154. By way of example, the signal leads 154 may be provided and/or one or more interfaces, which may be wireless interfaces and/or wire-bound interfaces. Further, the signal leads 154 may comprise one or more drivers and/or one or more measurement devices for generating sensor signals and/or for modifying sensor signals. The camera 110 may further comprise the housing 118 which, as an example, may encase one or more of components.

Further, the evaluation device 142 may fully or partially be integrated into the optical sensors 114 and/or into other components of the camera 110. The evaluation device may also be enclosed into housing 118 and/or into a separate housing. The evaluation device may comprise one or more electronic devices and/or one or more software components, in order to evaluate the sensor signals, which are symbolically denoted by the first aperture adjuster 144, the second aperture adjuster 146, the picture recording unit 148, and the comparison device 150. By combining the first picture and the second picture, preferably a three-dimensional image of the object 112, may be generated.

Further, the camera 110 comprises the at least one sensors 114 which may be configured in various ways. Thus, as depicted in exemplary embodiment of FIG. 4, two different optical sensors 114 may present which can, for example, be part of the camera 110 within the housing 118. Herein, a first optical sensor 114 may be a transversal optical sensor 182 while a second optical sensor 114 may be a longitudinal optical sensor 184. As described above, the longitudinal optical sensor 184 may have at least one sensor region 186, wherein the longitudinal optical sensor 184 may be designed to generate at least one longitudinal sensor signal in a manner dependent on an illumination of the sensor region 186 by the light beam 132, wherein the longitudinal sensor signal, given the same total power of the illumination, may be dependent on a beam cross-section of the light beam 132 in the sensor region 186. Herein, the evaluation device 142 may be further designed to generate at last one item of information on a longitudinal position of the object 112 by evaluating the longitudinal sensor signal.

As further described above, the transversal optical sensor 182 may have a sensor area 188, which may be transparent to the light beam 132 travelling from the object 112 to the camera 110. The transversal optical sensor 182 may, therefore, be adapted to determine a transversal position of the light beam 132 in one or more transversal directions, such as in the x- and/or in the y-direction. For this purpose, the at least one transversal optical sensor may further be adapted to generate at least one transversal sensor signal. Thus, the evaluation device 142 may, further, be designed to generate at least one item of information on a transversal position of the object 112 by evaluating the transversal sensor signal of the transversal optical sensor 182. The transversal optical sensor 182 may be fully or partially transparent or intransparent. The transversal optical sensor 182 may be or may comprise an organic imaging device or an inorganic imaging device. Preferably, the transversal optical sensor 182 may comprise a uniform sensor area 188 or at least one matrix of sensor pixels, wherein the matrix of sensor pixels may particularly be selected from the group consisting of: an organic semiconductor sensor device; an inorganic semiconductor sensor device, such as a CCD or a CMOS chip.

Further, by combining the information on the transversal position of the object 112 as acquired by the transversal optical sensor 182 with the information on the longitudinal position of the object 112 as acquired by the longitudinal optical sensor 184, the information related to the three-dimensional position of the object 112 may be obtained. This information may, thus, be used for the recording of the three-dimensional image of the object 112. For this purpose, the respective sensor signals may be transmitted by one or more signal leads 154 to the evaluation device 142 of the camera 110.

In the exemplary embodiment as shown in FIG. 4, the object 112 to be detected, as an example, may be designed as an article of sports equipment and/or may form a control element 190, the position and/or orientation of which may be manipulated by a user 192. Thus, generally, in the embodiment shown in FIG. 4 or in any other embodiment of the tracking system 180, the object 112 itself may be part of the named devices and, specifically, may comprise the at least one control element 190, specifically, wherein the at least one control element 190 has one or more beacon devices 194, wherein a position and/or orientation of the control element 190 preferably may be manipulated by user 192. As an example, the object 112 may be or may comprise one or more of a bat, a racket, a club or any other article of sports equipment and/or fake sports equipment. Other types of objects 112 are possible. Further, the user 192 may be considered as the object 112, the position of which shall be detected. As an example, the user 192 may carry one or more of the beacon devices 194 attached directly or indirectly to his or her body.

The camera 110 may be adapted to determine at least one item on a longitudinal position of one or more of the beacon devices 194 and, optionally, at least one item of information regarding a transversal position thereof, and/or at least one other item of information regarding the longitudinal position of the object 112 and, optionally, at least one item of information regarding a transversal position of the object 112. Particularly, the camera 110 may be adapted for identifying colors and/or for imaging the object 112, such as different colors of the object 112, more particularly, the color of the beacon devices 194 which might comprise different colors. The opening in the 118 housing, which, preferably, may be located concentrically with regard to the optical axis 116 of the camera 110, may preferably define a direction of a view 122 of the camera 110.

The camera 110 may be adapted for acquiring at least one image of the object 112, preferably a 3D-image. Additionally, the camera 110 may be adapted for determining the position of the at least one object 112. As outlined above, the acquisition of the image of the object 112 and/or a part thereof and/or the determination of a position of the object 112 and/or a part thereof by using the camera 110 may be used for providing a tracking system 180, in order to provide at least one item of information to a machine 196. In the embodiments schematically depicted in FIG. 4, the machine 196 may be or may comprise at least one computer and/or a computer system comprising the data processing device 152. Other embodiments are feasible. The evaluation device 142 may be a computer and/or may comprise a computer and/or may fully or partially be embodied as a separate device and/or may fully or partially be integrated into the machine 196, particularly the computer. The same holds true for a track controller 198 of the tracking system 180, which may fully or partially form a part of the evaluation device and/or the machine 196.

LIST OF REFERENCE NUMBERS 110 camera
112 object
114 optical sensor
116 optical axis
118 housing
120 opening
122 direction of view
124 coordinate system
126 transfer device
128 converging element
130 first aperture element
132 light beam
134 second aperture element
136 first aperture area
138 second aperture area
140 imaging device
142 evaluation device
144 first aperture adjuster
146 second aperture adjuster
148 picture recording unit
150 comparison device
152 data processing device
154 signal leads
156 compound lens
158 telecentric lens
160 entrance pupil
162 center
164 focal plane
166 image space
168 object space
170 pixelated optical element
172 spatial light modulator
174 matrix
176 pixel
178 target
180 tracking system
182 transversal optical sensor
184 longitudinal optical sensor
186 sensor region
188 sensor area
190 control element
192 user
194 beacon device
196 machine
198 track controller

The invention claimed is:

1. A camera for recording at least one image of at least one object, comprising:
at least one converging element a configured to converge a light beam passing through the converging element to travel along a beam path to be received by at least one optical sensor;
at least one first aperture element comprising a first adjustable area, wherein the first aperture element is located in the beam path between the converging element and the optical sensor;
at least one second aperture element comprising a second adjustable area, wherein the second aperture element is located in the beam path between the first aperture element and the optical sensor;
the at least one optical sensor configured to receive the light beam, wherein the optical sensor is further configured to generate at least one first picture in a first setting comprising the first aperture area exceeding the second aperture area and to generate at least one second picture in a second setting comprising the second aperture area exceeding the first aperture area; and
at least one evaluation device configured to generate at least one image of the at least one object by comparing the at least one first picture and the at least one second picture.

2. The camera according to claim 1, wherein the converging element comprises a converging lens or a compound lens, wherein the compound lens is configured to function together with the second aperture device as one of a telecentric lens and a hypercentric lens.

3. The camera according to claim 1, wherein the first aperture element is located in a focal plane within an image space of the converging element.

4. The camera according to claim 1, wherein the first aperture element and/or the second aperture element comprises an adjustable aperture stop.

5. The camera according to claim 1, wherein the second aperture element comprises at least one spatial light modulator configured to modify at least one property of the light beam in a spatially resolved fashion, the spatial light modulator comprising a matrix of pixels, each pixel being controllable to individually modify the at least one optical property of a portion of the light beam passing the pixel before the light beam reaches the at least one optical sensor.

6. The camera according to claim 5, further comprising at least one modulator device configured to periodically control at least two of the pixels with different modulation frequencies.

7. The camera according to claim 5, wherein each of the pixels of the spatial light modulator is individually controllable in a manner such that the adjustable area of the second aperture element is adjustable and/or a location of the second aperture element perpendicular to the optical axis is adjustable.

8. The camera according to claim 5, wherein each of the pixels of the spatial light modulator comprises at least one micro-lens, wherein the micro-lens is a tunable lens.

9. The camera according to claim 1, wherein the optical sensor comprises an inorganic imaging device.

10. The camera according to claim 9, wherein the inorganic imaging device comprises: a pixelated inorganic chip; a pixelated organic detector; a CCD chip; a CMOS chip; an IR chip; or an RGB chip.

11. The camera according to claim 1, wherein the optical sensor comprises at least one longitudinal optical sensor, wherein the longitudinal optical sensor comprises at least one sensor region and is configured to generate at least one longitudinal sensor signal in a manner dependent on an illumination of the sensor region by the light beam, wherein the longitudinal sensor signal, given a same total power of the illumination, is dependent on a beam cross-section of the light beam in the sensor region, wherein the evaluation device is further configured to generate at least one item of information on a longitudinal position of the object by evaluating the longitudinal sensor signal.

12. The camera according to claim 11, further comprising at least one modulation device configured to modulate an intensity of the light beam by using at least one modulation frequency, wherein the longitudinal sensor signal, given the same total power of the illumination, is further dependent on a modulation frequency of the modulation of the illumination, and wherein the evaluation device is further configured to generate at least one item of information on a longitudinal position of the object by evaluating the modulation frequency.

13. The camera according to claim 1, wherein the evaluation device is configured to combine first information comprised within the at least one first picture and second information comprised within the at least one second picture in order to generate at least one three-dimensional image of the at least one object.

14. The camera according to claim 1, further comprising at least one housing comprising at least one opening, wherein the converging element is located at the opening, and wherein at least the first aperture element, the second aperture element, and the optical sensor are located inside the housing.

15. The camera according to claim 12, further comprising at least one illumination source.

16. The camera according to claim 15, wherein the modulation device is configured to modulate the illumination source.

17. A tracking system for tracking the position of at least one movable object, comprising:
   at least one camera according to claim 1; and
   at least one track controller, wherein the track controller is configured to track a series of positions of the object, each position comprising at least one item of information on at least a longitudinal position of the object at a specific point in time.

18. A method for recording at least one image of at least one object, the method comprising:
   generating at least one first picture in a first setting of a camera comprising a first aperture area of at least one first aperture element exceeding a second aperture area of at least one second aperture element and generating at least one second picture in a second setting of the camera comprising the second aperture area exceeding the first aperture area by using at least one optical sensor configured to receive the light beam, wherein the light beam is converged by passing through a converging element to travel on a beam path to the at least one optical sensor, wherein the first aperture element is located in the beam path between the converging element and the optical sensor, and wherein the second aperture element is located in the beam path between the first aperture element and the optical sensor; and
   generating at least one image of at least one object by comparing the at least one first picture and the at least one second picture.

19. The method according to claim 18, wherein the first aperture element and/or the second aperture element comprises an adjustable aperture stop, wherein the aperture area of the aperture stop is adjusted and/or the location of the second aperture element perpendicular to the optical axis of the camera is adjusted.

20. The method according to claim 18, wherein the second aperture element comprises at least one spatial light modulator configured to modify at least one property of the light beam in a spatially resolved fashion, comprising a matrix of pixels, wherein each pixel is individually controlled to modify the at least one optical property of a portion of the light beam passing the pixel before the light beam reaches the at least one optical sensor in a manner that the second adjustable area of the second aperture element is adjusted and/or the location of the second aperture element perpendicular to the optical axis of the camera is adjusted.

21. The method according to claim 19, wherein at least two second pictures are generated, and wherein the location of the second aperture element perpendicular to the optical axis of the camera is adjusted between generating the at least two second pictures.

* * * * *

UNITED STATES PATENT AND TRADEMARK OFFICE
CERTIFICATE OF CORRECTION

PATENT NO. : 10,412,283 B2
APPLICATION NO. : 15/758135
DATED : September 10, 2019
INVENTOR(S) : Robert Send et al.

It is certified that error appears in the above-identified patent and that said Letters Patent is hereby corrected as shown below:

On the Title Page

Page 6, Column 1, item [56], Other Publications, Line 47, "Manfacturers" should read --Manufacturers--;

Page 7, Column 1, item [56], Other Publications, Line 6, "Tthe" should read --The--;

Page 7, Column 1, item [56], Other Publications, Line 42, ""Synthesis" should read --"Syntheses--;

Page 7, Column 1, item [56], Other Publications, Line 58, ""Conformationaily" should read --"Conformationally--;

Page 7, Column 1, item [56], Other Publications, Line 58, "Bothpy:" should read --Bodipy:--;

In the Specification

Column 35, Line 62, "engraivers," should read --engravers,--;

Column 35, Line 62, "buiscuit" should read --biscuit--;

In the Claims

Column 53, Line 62, Claim 1, "at least one converging element a configured" should read --at least one converging element configured--.

Signed and Sealed this
Twenty-eighth Day of April, 2020

Andrei Iancu
*Director of the United States Patent and Trademark Office*